United States Patent
Ishii et al.

(10) Patent No.: US 6,806,925 B2
(45) Date of Patent: Oct. 19, 2004

(54) MANUFACTURING METHOD OF LIQUID CRYSTAL DISPLAY DEVICE

(75) Inventors: Akira Ishii, Mobara (JP); Miyo Shimizu, Mobara (JP); Shigeru Matsuyama, Mobara (JP)

(73) Assignees: Hitachi, Ltd., Tokyo (JP); Hitachi Device Engineering Co., Ltd., Chiba-ken (JP)

( * ) Notice: Subject to any disclaimer, the term of this patent is extended or adjusted under 35 U.S.C. 154(b) by 207 days.

(21) Appl. No.: 09/951,713

(22) Filed: Sep. 14, 2001

(65) Prior Publication Data

US 2002/0054252 A1 May 9, 2002

(30) Foreign Application Priority Data

Sep. 20, 2000 (JP) ........................................ 2000-290328

(51) Int. Cl.[7] ............................................. G02F 1/1335
(52) U.S. Cl. ........................ 349/106; 349/105; 349/107; 345/85; 345/86; 345/87; 430/8; 430/9; 106/31.27
(58) Field of Search .............................. 345/85, 86, 87; 430/7, 8, 9; 106/31.27

(56) References Cited

U.S. PATENT DOCUMENTS

| | | | | |
|---|---|---|---|---|
| 5,811,209 A | * | 9/1998 | Eida et al. ..................... 430/7 |
| 6,040,005 A | * | 3/2000 | Carr et al. ................... 427/197 |
| 6,063,174 A | * | 5/2000 | Shirota et al. ........... 106/31.27 |
| 6,238,827 B1 | * | 5/2001 | Nakazawa et al. ............. 430/7 |
| 6,248,482 B1 | * | 6/2001 | Kashiwazaki et al. .......... 430/7 |
| 6,535,188 B1 | * | 3/2003 | Morimoto ..................... 345/87 |

* cited by examiner

Primary Examiner—Minhloan Tran
Assistant Examiner—Fazli Erdem
(74) Attorney, Agent, or Firm—Reed Smith LLP; Stanley P. Fisher, Esq.; Juan Carlos A. Marquez, Esq.

(57) ABSTRACT

The irregularities of coloring concentration which is generated between dyed media when a color filter substrate which is prepared in a manufacturing method of a liquid crystal display device is manufactured by supplying ink to dyed media formed on a main surface of the color filter substrate using an ink jet method. In the present invention, as color filter ink which is supplied to the dyed media formed on the color filter substrate using the inkjet method, liquid which contains dye which colors the dyed media, solvent (for example, water) which has an affinity for the dye, a volatility-adjusting agent (for example, glycerin) which lowers the volatility of the ink to a level below the volatility of the solvent, and a dyeing-promoter agent (for example, N-methyl-2-pyrrolidone) which exhibits a higher affinity for the dye and the dyed media than the volatility adjusting agent. Then, the dyed media is colored with this ink.

18 Claims, 11 Drawing Sheets

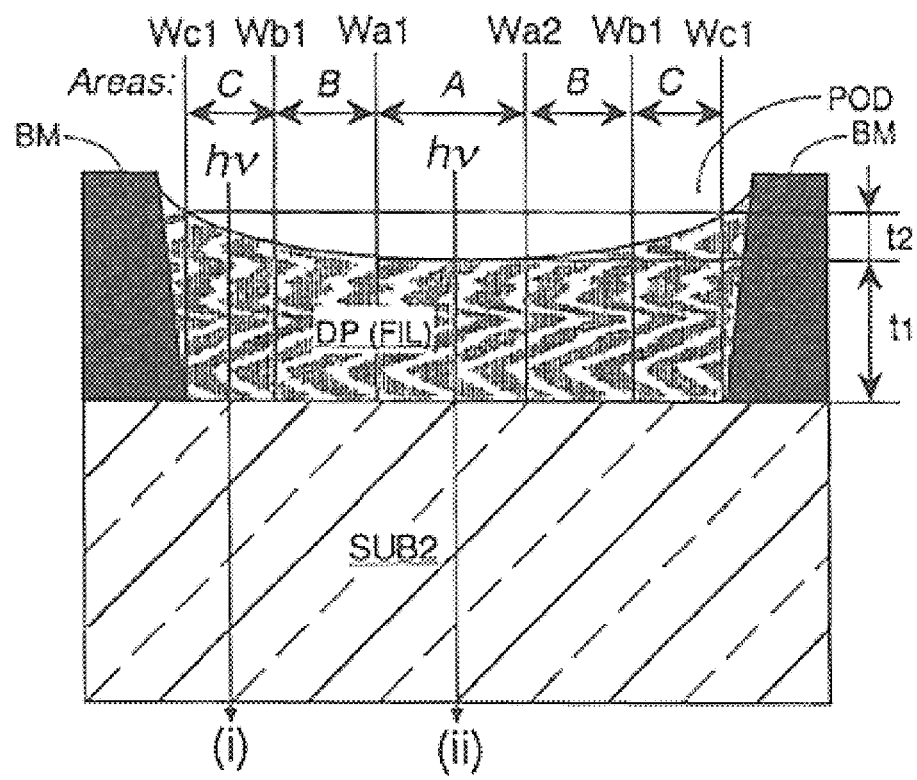
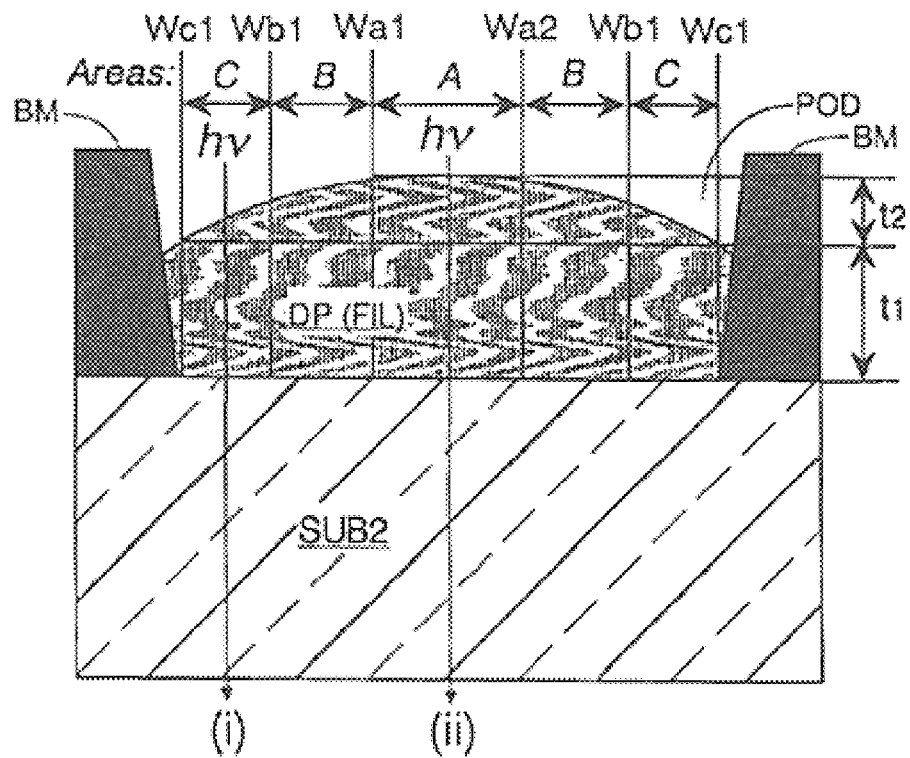

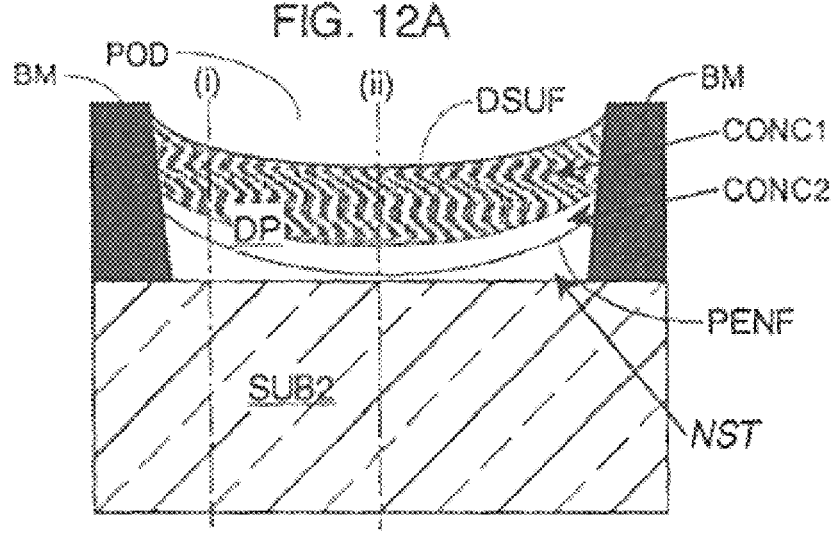
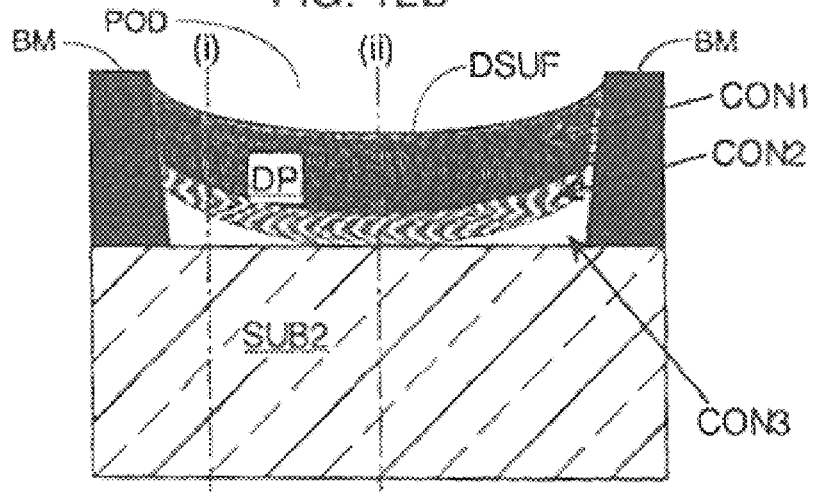
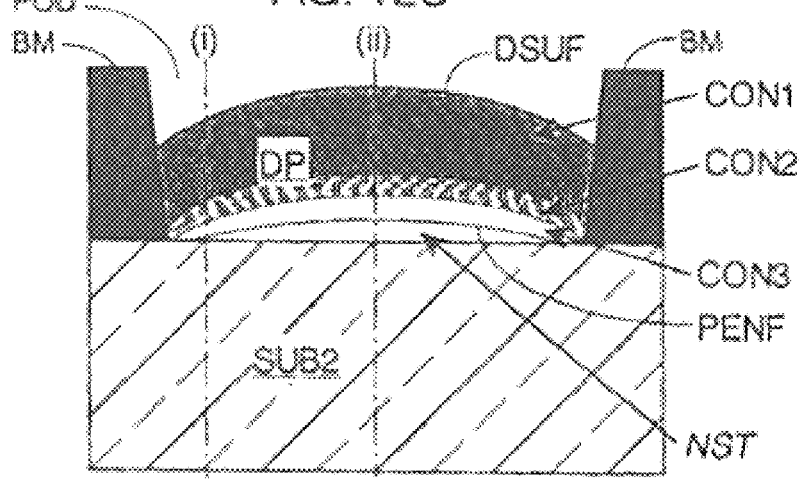

MANUFACTURING METHOD OF LIQUID CRYSTAL DISPLAY DEVICE

BACKGROUND OF THE INVENTION

1. Field of the Invention

The present invention is related to a manufacturing method of a liquid crystal display device, particularly to a dyeing method applied to a dyed medium (a medium to be colored, also called "a reception layer for ink", hereinafter) formed on a color filter substrate thereof prepared for the manufacturing process thereof, ink suitable for the dyeing method, and a dyeing step for supplying the ink to the medium using a ink-jet type printer (an ink-coating apparatus).

2. Description of the Related Art

In a liquid crystal display device having a color image display function, a light shielding film made of material having low optical transmissivity is formed on at least one of a pair of substrates which sandwich a layer formed of liquid crystal composition therebetween, openings are formed in regions of the light shielding film which correspond to pixels, and a layer exhibiting the high transmissivity to light in a given wavelength range compared to the light shielding film is formed at each opening region. The light shielding film which is provided with the openings for light transmission is called a black matrix. Layers which are provided to respective opening regions and allow light in a given range to pass therethrough are called color filters, and a substrate on which these color filters are formed (in many case, a so-called transparent substrate which is made of glass, synthetic regin or the like having the high optical transmissivity and the high electrical insulation) is called a color filter substrate. In the liquid crystal display device having the color image display function, the respective color filters mounted on the color filter substrate served for the liquid crystal display device are classified into a plurality of kinds corresponding to the ranges of wavelength which exhibit the high optical transmissivity. In general, the respective color filters exhibit the high optical transmissivity at any one of three kinds of wavelength ranges which respectively correspond to red, green and blue depending on the three principle colors of light. In other words, on the color filter substrate which is used in the general color liquid crystal display device, at least three kinds of color filters which have colors different from each other are formed.

As one of the manufacturing methods of a color filter substrate, there has been known a coloring resist method which forms a plural kinds of color filters by repeating a so-called photolithography process in which a substrate (eventually constituting a color filter substrate) is coated with a resist made of high-polymer resin material having pigment in a given color dispersed therein, the resist is subjected to an exposure using a photo mask and the resist is developed in accordance with an exposure pattern (resist partially removed from the color filter substrate). Further, as another one of manufacturing methods of a color filter substrate, there has been known a dyeing method in which dyed media (also called "reception layers") are formed at a plural portions of a substrate and dyeing material such as dyes or pigments of given colors are supplied to respective dyed medium so as to perform coloring.

As described above, the coloring resist method has to repeat the photolithography process for respective colors and hence, there exists a limitation with respect to the manufacturing throughput of the color filter substrates and eventually the manufacturing throughput of liquid crystal display devices for the color image display using such a method. Further, in the color resist method, the resist in which the pigment of a given color is dispersed flows into or is scattered into a pixel region which is disposed close to or adjacent to a pixel region in which the color filter using such a resist is formed (the pixel region in which the another color filter made of the resist in which pigment having color different from the given color is dispersed) so that there is a possibility that an undesirable kind of pigment for another color filter may be mixed into another color filter.

On the other hand, the dyeing method which coats the dyed media on the color filter substrate is classified into several kinds depending on the method (device) which supplies the dye (hereinafter called "dye ink" or simply called "ink") to the dyed media. As one typical example of the ink supply method, there has been known a technique which is disclosed in Japanese Laid-open Patent Publication 209669/1999 or the like in which a piezoelectric transducer is used and ink is ejected from an ink chamber due to the deformation of the piezoelectric transducer. Further, as another typical example of the ink supply method, there has been a technique which is disclosed in Japanese Laid-open Patent Publication 202124/1999 in which an ink chamber is heated so as to swell bubbles generated in the inside of the ink whereby the ink is ejected. The ink supply devices used in these techniques are respectively described in "Technologies & Materials for Inkjet Printer, 1998.7.31" (published by CMC Ltd., in Japanese), wherein the former is described in "the Eighth Chapter Piezoelectric-type Inkjet Printer" (pages 101–111) and the latter is described in "the Seventh Chapter Thermal Jet Printer" (pages 71–100). In this specification, for the convenience sake, the method for supplying ink to the color filter substrate using the former is called "piezoelectric method" or "electromechanical conversion type inkjet method" and the method for supplying ink to the color filter substrate using the latter is called "thermal jet method". Further, the color filter substrate manufacturing method which colors the dyed media formed on the color filter substrate by ejecting droplets of ink toward the color filter substrate using a device including the former and the latter is generally called "inkjet method".

Two examples of the ink supply device adopting the piezoelectric method described on pages 190–191 of "Technologies & Materials for Inkjet Printer" are schematically shown in FIG. 6A and FIG. 6B, while one example of the ink supply device adopting the thermal jet method described on pages 73–75 of the same literature is schematically shown in FIG. 6C. The ink supply device shown in FIG. 6A supplies ink (dye) INK into an ink chamber CHM through an ink supply passage SPP and also supplies the ink INK into a pressure chamber PRC through an orifice ORF which is formed in the ink chamber CHM. At a position which faces the orifice ORF of the ink chamber CHM in an opposed manner, a nozzle NOZ having an opening smaller than the orifice ORF is disposed and the ink INK which is supplied into the ink chamber CHM is ejected to the dyed media of the color filter substrate through the nozzle NOZ. However, since the opening of the nozzle NOZ is small, usually, there is no possibility that the ink INK which is supplied into the ink chamber CHM through the ink supply passage SPP is ejected or leaked from the opening of the nozzle NOZ.

On the other hand, a plate-like piezoelectric crystal element PZT is arranged at a side opposite to the ink chamber CHM of the pressure chamber PRC. The piezoelectric crystal element PZT shown in FIG. 6A is in the state that a given voltage is not applied to the piezoelectric crystal element PZT. When the given voltage is applied to the piezoelectric crystal element PZT, a central portion thereof is deflected to the left side in FIG. 6A so as to expand the volume of the pressure chamber PRC. That is, by applying the given voltage to the piezoelectric crystal element PZT, the ink flows into the expanded pressure chamber PRC. Thereafter, when the applying of the given voltage to the piezoelectric crystal element PZT is stopped, the piezoelectric crystal element PZT restores the shape shown in the drawing and the volume of the pressure chamber PRC also returns to the volume shown in the drawing and hence, the ink which flows into the pressure chamber PRC at the time of the expansion of the pressure chamber PRC returns to the ink chamber CHM through the orifice ORF thus increasing the pressure in the inside of the ink chamber CHM. As a result, a portion of the ink INK in the inside of the ink chamber CHM is ejected from the opening of the nozzle NOZ.

The structure of the ink supply device shown in FIG. 6B differs from the structure of the ink supply device shown in FIG. 6A in that, with respect to a nozzle NOZ, an ink supply passage SPP, a pressure chamber PRC and an ink chamber CHM are arranged in series and a piezoelectric crystal element PZT is formed in a cylindrical shape. However, the ink supply device shown in FIG. 6B adopts the same operational principle with the ink supply device shown in FIG. 6A. That is, by applying a given voltage to the piezoelectric crystal element PZT shown in FIG. 6B, the piezoelectric crystal element PZT is expanded in the circumferential direction so as to make the ink flow into the pressure chamber PRC. Subsequently, the applying of the given voltage to the piezoelectric crystal element PZT is stopped so that an excessive amount of ink is fed into the ink chamber CHM from the pressure chamber PRC through an orifice ORF so that the inside of the ink chamber CHM is pressurized whereby a portion of the ink INK is ejected from the nozzle NOZ. Here, with respect to the ink supply device shown in FIG. 6B, a micro valve MIV is arranged between the ink supply passage SPP and the pressure chamber PRC. This micro valve MIV functions as a check valve for preventing a counterflow of the ink inside the pressure chamber to the ink supply passage SPP due to the contraction of the volume of the pressure chamber PRC when the applying of the given voltage to the piezoelectric crystal element PZT is stopped.

As described above, in the method for supplying ink to the color filter substrate using the piezoelectric method, by applying the given voltage to the piezoelectric crystal element PZT, the piezoelectric crystal element PZT is mechanically deformed in the direction of an arrow shown in FIG. 6A or FIG. 6B so as to pressurize the ink chamber CHM whereby the ink INK is supplied to the dyed media formed on the color filter substrate.

On the other hand, in the thermal jet method, as shown in FIG. 6C, a heater element HTR is provided to an ink chamber CHM and ink in the inside of the ink chamber CHM is heated by the heater element HTR so as to generate bubbles in the inside of the ink whereby the ink INK is ejected. As shown in FIG. 6C, the pressure in the inside of an ink supply passage SPP which is coupled to the ink chamber CHM is set to an appropriate negative pressure to the ink chamber CHM. Accordingly, in the state that the ink chamber CHM is not heated by the heater element HTR, a meniscus of the ink at an opening OPN of the ink chamber CHM is formed such that the meniscus forms a concave surface toward a central portion of the opening. Accordingly, there is no possibility that the ink stored in the link chamber CHM is ejected or leaked from the opening OPN. However, when the ink chamber CHM is heated by the heater element HTR, bubbles are generated in the inside of the stored ink and the bubbles become large gradually. As the bubbles become large in this manner, the meniscus of the ink at the opening OPN of the ink chamber CHM is changed to form a convex surface toward the center of the opening. When the curvature of the meniscus which forms such a convex surface is increased and reaches a certain level, droplets of the ink INK are ejected from the opening OPN. Accordingly, in the method for supplying the ink toward the color filter substrate using the thermal jet method, there is no possibility that the ink is ejected through a nozzle having a small opening and hence, the method has an advantageous effect that the ink is not clogged in the nozzle compared to the piezoelectric method. However, on the other hand, the ink supply method which adopts the thermal jet method has a drawback that the formation of bubbles in the inside of the ink chamber CHM determines the ink supply conditions to the color filter substrate so that the proper control is difficult.

To the contrary, along with the improvement of the response characteristics of the piezoelectric crystal element, the piezoelectric method can reliably supply a given quantity of ink to the dyed media formed on the color filter substrate so long as the nozzle is not clogged. Further, irrespective of the piezoelectric method or the thermal jet method, in the inkjet method, by arranging a plurality of so-called inkjet heads shown in FIGS. 6A–6C in an array due to the refinement of the supply device, a plural kinds of inks can be simultaneously supplied to respective dyed media formed on the color filter substrate so that the manufacturing throughput of the color filter substrate can be remarkably enhanced compared with the coloring resist method.

SUMMARY OF THE INVENTION

As described above, the manufacturing method of color filters using the inkjet type ink supply device adopting the piezoelectric system is recognized as a suitable technique to enhance the productivity of the color filter substrates and liquid crystal display devices into which the color filter substrates are incorporated provided that the nozzles of the ink supply devices are not clogged. Further, the frequency of the clogging of the nozzle of the ink supply device which has been considered as only one weak point thereof can be decreased by improving the composition of the solution of the ink (dye). With the use of the recent ink composition disclosed in the above-mentioned Japanese Laid-open Patent Publication 209669/1999, not only the problem that the ink is clogged in the nozzle of the ink supply device is solved but also the flight linearity of the ink ejected from the nozzle is improved. Accordingly, it has been expected that by reliably supplying a given quantity of ink to the dyed media formed on the color filter substrate using the ink supply device adopting the piezoelectric method, the production of the color filter substrate having the dyed media which are dyed with the dye having a desired concentration can be realized.

However, in the reality, even with the above-mentioned improvement of the ink composition, there still remains a drawback that the difference is generated in the concentration of color among dyed media which are colored in given colors (corresponding to pixels or a group of pixels of the liquid crystal display device). That is, even when the physical properties of the ink (viscosity, surface tension, contact angle to the dyed media and the like) are optimized, the levels of the coloring concentrations of the dyed media with the dyes (this parameter being called "dyeing performance")

become non-uniform. Inventors of the present application have focused their attention on the correlation between parameters such as irregularities of the sizes of the ink liquid droplets ejected from the ink supply device, the evaporation speed of the ink liquid droplets and the like and the ink composition and have reviewed the dyeing performance of the ink (ink composition).

It is an object of the present invention to provide a method for producing a liquid crystal display device exhibiting no color irregularities by providing a process suitable for supplying ink to and coloring dyed media formed on a color filter substrate which is prepared in a manufacturing process of the liquid crystal display device using an inkjet method (particularly, the method using an ink supply device adopting the piezoelectric method) and by providing ink having the composition suitable for coloring of the dyed media.

To achieve the above-mentioned object, the present invention is directed to a manufacturing method of liquid crystal display device which includes a step for preparing a first substrate having a first main surface on which color filters are formed, a step for bonding the first substrate and a second substrate having a second main surface with a sealing material at respective peripheries of the first and second substrate being superposed one another so that the first main surface and the second main surface are spaced from and opposite to one another, and a step for injecting liquid crystal substances into a space enclosed by the first and second main surfaces and sealing material, wherein the color filters are formed by coloring dyed media provided on the first main surface with ink, and as the ink which colors the dyed media, material which includes dye coloring the dyed media, solvent having affinity for the dye, a volatility-adjusting agent lowering volatility of the ink below that of the solvent and a dyeing-promoter agent (also described as a dyeing-accelerating agent, or dyeing accelerator agent) indicating higher affinity for the dye and the dyed media than to the volatility-adjusting agent is used thus preparing the first substrate (color filter substrate).

In preparing the color filter substrate, it is desirable that the above-mentioned ink (color filter ink) includes the dye for coloring the dyed media in a range from 1 to 5 weight percent thereof, solvent which has affinity with the dye (dye being resolved) in a range from 10 to 80 weight percent thereof, a volatility-adjusting agent which lowers the volatility of the ink below the volatility of the solvent in a range from 1 to 40 weight percent thereof, and a dyeing-promoter agent exhibiting higher affinity for the dye and the dyed media than the volatility-adjusting agent in a range from 1 to 30 weight percent thereof. Here, the detail of the definitions and effects of the respective volatility-adjusting agent and the dyeing-promoter agent will be explained later in the embodiments of the present invention.

It is preferable to use a reagent which indicates a higher boiling point than that of the solvent as the volatility-adjusting agent, while it is preferable to use a reagent which indicates viscosity lower than that of the volatility-adjusting agent and higher than that of the solvent as the dyeing-promoter agent.

Further, as the above-mentioned dyeing-promoter agent, it is preferable to use a compound having at least one selected from a group consisting of ester linkage, peptide linkage and bonding structure which replaces a hydrogen atom which is linked with a nitrogen atom of peptide linkage with other functional group (peptide linkage having a nitrogen atom thereof modified) in molecules. For example, it is preferable to use pyrrolidone series, lactone series or the like which have a molecular structure including a cyclic portion formed by bonding a plurality of carbon atoms and at least one molecule other than one carbon by a single bond and forms at least one of ester linkage, peptide linkage and bonding structure which modifies a nitrogen atom thereof in the cyclic portion. To use the compound having the ester linkage or peptide linkage as the dyeing-promoter agent is particularly recommendable for the manufacturing method of the liquid crystal display device which forms the dyeing media by polymerizing the organic material on a main surface of at least one of a pair of the above-mentioned substrates through ester linkage, peptide linkage and bonding structure which replaces a hydrogen atom which is linked with a nitrogen atom of peptide linkage with other functional group. As an example of the organic polymer which is formed by such a polymerization, an acrylic resin or a protein film (a casein, gelatin or the like) can be named.

A specific example of the color filter ink suitable for carrying out the present invention contains the dye for coloring the dyed media which constitutes the color filter in a range from 1 to 5 weight percent thereof, water or hydrophilic solvent in a range from 10 to 80 weight percent thereof, and at least one selected from the group consisting of glycerin, dimethyl sulfoxide, and sodium lactate in a range from 1 to 40 weight percent thereof, and the at least other one selected from the another group consisting of N-methyl-2-pyrrolidone and γ-butyrolactone in a range from 1 to 30 weight percent thereof respectively. In this case, the above-mentioned dye may be any compound selected from a group consisting of azo complex, phthalochanine, and anthraquinone. Further, in manufacturing the color filter substrate on which the above-mentioned dyed media is formed using the ink, it is preferable to form the dyed media using any resin selected from a group consisting of acrylic resin, casein resin and gelatin resin.

To further specifically illustrate an example of the color filter ink according to the present invention, the color filter ink contains the dye which may be any compound selected from a group consisting of azo complex, phthalochanine, and anthraquinone in a range from 1 to 5 weight percent thereof, water in a range from 10 to 80 weight percent thereof, and at least one selected from the group consisting of glycerin, dimethyl sulfoxide, and sodium lactate in a range from 1 to 40 weight percent thereof, and the at least other one selected from the another group consisting of N-methyl-2-pyrrolidone and γ-butyrolactone in a range from 1 to 30 weight percent thereof respectively. In such ink, it is preferable to set the composition ratio of water to a range from 50 to 70 weight percent.

On the other hand, according to the present invention, in the preparation process (manufacturing process) of the color filter substrate including:

(1) a first step for forming a light shielding film having lower optical transmissivity than that of the first substrate over a first main surface of a substrate which is used as a color filter substrate of a liquid crystal display device, and then forming a plurality of openings in the light shielding film in such a manner that the opening are spaced from each other;

(2) a second step for forming dyed media made of resin which has higher optical transmissivity than that of the light shielding film in a plurality of respective openings formed through the light shielding film;

(3) a third step for coloring the dyed media formed in the respective openings by supplying droplets of the ink to a plurality of respective openings; and (4) a fourth step for forming a protection film on the light shielding film so as to cover the respective dyed media in the plurality of respective openings with the protection film.

(5) liquid including dye coloring the dyed media, solvent for the dye, a first reagent having lower volatility than that of the solvent, and a second reagent having higher permeability into the resin constituting the dyed media than that of the solvent is utilized for the ink.

In the third step, the droplets of the ink are supplied to each of the plurality of openings from a nozzle comprising an ink chamber and volume of the ink chamber is varied by a piezoelectric crystal element.

The volume of the droplets of ink supplied to each of the plurality of openings is suitably set to an amount which falls in a range from 1 pico-liter to 100 pico-liter (a unit of volume which is also described as pL and 1 pL is equal to $10^{-9}$ liter) corresponding to the size of the dyed media formed on the color filter substrate or the shape of nozzles used for the manufacturing of the color filter.

The reason that the volume of droplets of ink ejected from the nozzles covers such a wide range is that the manufacturing method of the color filter substrate according to the present invention is universally applicable to the manufacturing of various kinds of and versatile color filter substrates ranging from color filter substrates for small-sized liquid crystal display devices for portable telephones to color filter substrates for large-sized liquid crystal display devices for video walls installed at streets, stations or airports.

However, since the surface area of the ink droplets is changed corresponding to the change of volume of the droplets of ink, it is preferable to adjust the composition ratio of the first reagent for the purpose of appropriately suppressing the drying of the ink on the surface of the nozzles and dyed media corresponding to the ink supply device (for manufacturing of small-sized color filter substrates or for manufacturing of large-sized color filter substrates). For example, when the volume of the droplets of ink supplied to each of the plurality of openings amounts in a range from 2 pico-liter to 6 pico-liter, it is preferable that the composition ratio of the dye in the ink is set in a rage from 1 to 5 weight percent thereof, the composition ratio of the solvent in the ink is set in a range from 10 to 80 weight percent thereof, the composition ratio of the first reagent (the above-mentioned glycerin or an equivalent thereof) in the ink is set in a range from 5 to 20 weight percent thereof, and the composition ratio of the second reagent (N-methyl-2-pyrrolidone or an equivalent thereof) in the ink is set in a range from 1 to 30 weight percent thereof.

Further, when the volume of the droplets supplied to each of the plurality of openings amounts in a range from 20 pico-liter to 40 pico-liter, it is preferable that the composition ratio of the dye in the ink is set in a rage from 1 to 5 weight percent thereof, the composition ratio of the solvent in the ink is set in a range from 10 to 80 weight percent thereof, the composition ratio of the first reagent in the ink is set in a range from 30 to 40 weight percent thereof, and the composition ratio of the second reagent in the ink is set in a range from 1 to 30 weight percent thereof.

In the above-mentioned second step, the resin constituting the dyed media may be provided by forming a layer of a material having a property to be hardened by the irradiation of light thereto on the light shielding film, and then by hardening parts of the material layer by the irradiation of light from a second main surface of the substrate opposite to the first main surface of the substrate.

For forming the dyed media or the second reagent, it is preferable to use organic compound having at least one selected from ester linkage, peptide linkage and a bonding structure which replaces a hydrogen atom bonded to a nitrogen atom of the peptide linkage with other functional group in respective molecules.

It is recommendable to apply the above-mentioned manufacturing method of color filter substrates to, for example, the manufacturing of the small-sized passive matrix type liquid crystal display devices which are mounted on portable telephones. In this case, after completing the above-mentioned fourth step, a plurality of first electrodes in a stripe shape which are made of transparent conductive films are mounted on an upper portion of the protection film in parallel, and a first main surface of the substrate is bonded to the other substrate which has a main surface on which a plurality of second electrodes in a stripe shape made of transparent conductive films are formed with a sealing material which is coated on the periphery of at least one of the first main surface and the main surface of the other substrate after facing the first main surface and the main surface of the other substrate each other in an opposed manner such that the stripes of the first electrodes and the stripes of the second electrodes intersect each other. Thereafter, the liquid crystal compound is filled in a gap or space defined between the first main surface and the main surface of the other substrate. In such a manufacturing method of liquid crystal display devices, as the substrate which constitutes the color filter substrate, a soda lime glass having a silicon oxide film on the first main surface thereof is used. In manufacturing the color filter substrates of the small-sized passive matrix type liquid crystal display devices, it is preferable to set the volume of the ink droplets ejected from the ink supply device in a range from 2 to 4 pico-liter, for example.

These described above and other objects, features and advantages of the present invention will become more apparent from the following description when taken in conjunction with the accompanying drawings.

BRIEF DESCRIPTION OF THE DRAWINGS

FIG. 6A to FIG. 6C are explanatory views which generally show the typical structures of inkjet heads mounted on an inkjet type ink supply device, wherein FIG. 6A and FIG. 6B show the inkjet heads adopting the piezoelectric method and FIG. 6C shows the inkjet head adopting the thermal jet method, respectively;

FIG. 9A and FIG. 9B are perspective views for explaining an example which mounts the liquid crystal display panel PNL which is explained in conjunction with FIG. 7 and FIG. 8 on a liquid crystal display device, wherein FIG. 9A is the perspective view for explaining the arrangement of the liquid crystal display panel and a light source unit (backlight system) in the liquid crystal display device and FIG. 9B is the perspective view for showing a contour of the liquid crystal display device which is completed by inserting the liquid crystal display panel into which the light source unit shown in FIG. 9A is incorporated into a frame member;

FIGS. 11A and 11B are cross sectional views of the enlarged opening of the black matrix shown in FIG. 10 taken along the dot-dash line B–B' therein, FIG. 11A is depicted for the black matrix formed of a hydrophilic material, and FIG. 11B is depicted for the black matrix formed of a hydrophobic material; and FIGS. 12A–12C are cross sectional views of the enlarged opening of the black matrix formed in the novel color filter structures according to the present invention.

DETAILED DESCRIPTION

Embodiments of the present invention are explained in detail in conjunction with drawings hereinafter.
<<General structure of liquid crystal display panel and liquid crystal display devices>>

First of all, the constitution of a liquid crystal display device into which a color filter substrate which is manufactured in accordance with a manufacturing method of a liquid crystal display device according to the present invention is incorporated is explained by taking a liquid crystal panel which uses twist-nematic type (TN type) liquid crystal and controls an electric field which is applied to the liquid crystal with a thin film transistor provided to one of a pair of substrates which sandwich the liquid crystal therebetween and a liquid crystal display device which incorporates the liquid crystal display panel therein as examples.

Figure 7:
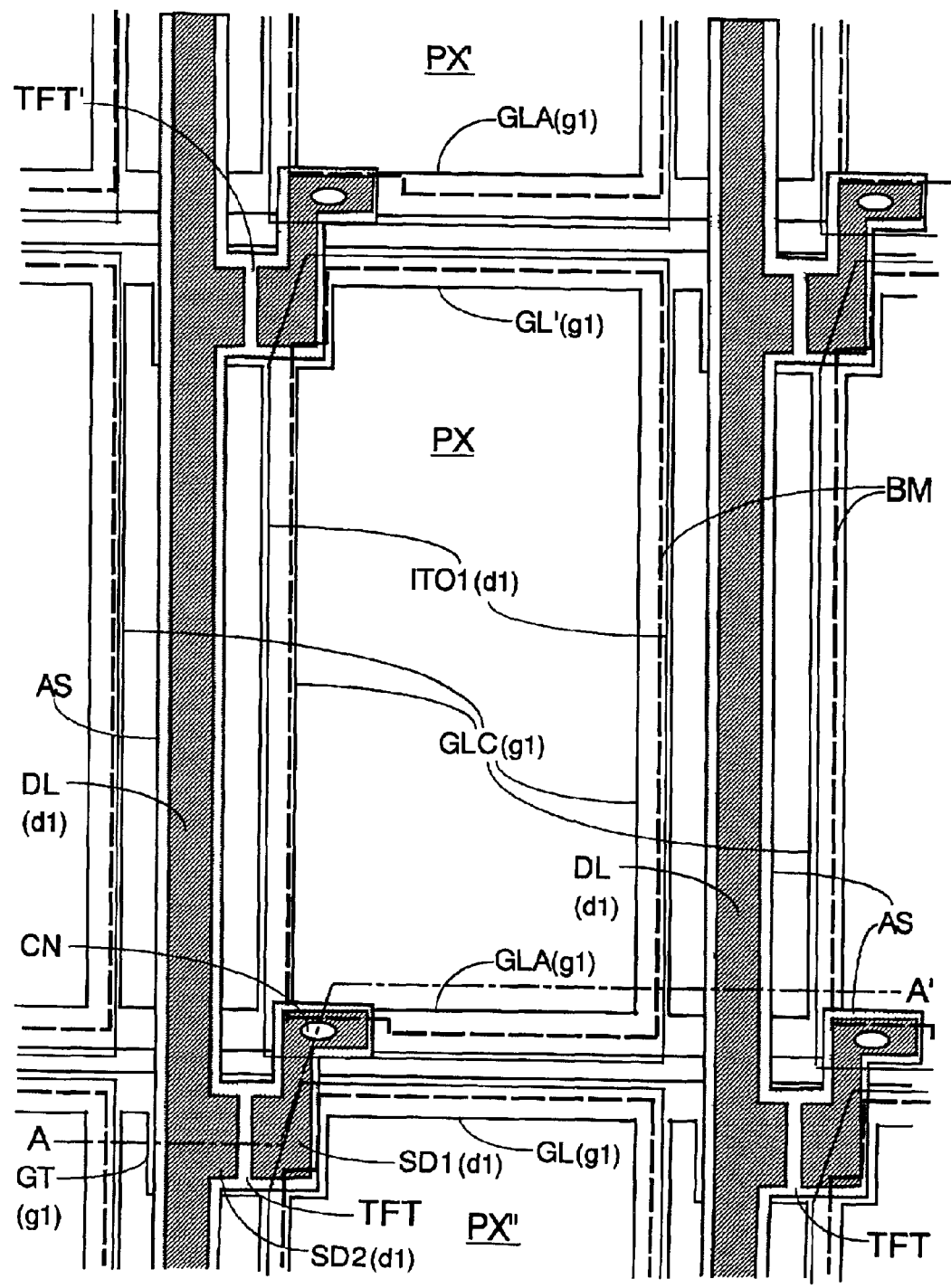
FIG. 7 is a plan view showing the constitution in the vicinity of a pixel of an example of a liquid crystal display panel on which the color filter substrate manufactured by the color filter substrate manufacturing method according to the present invention is mounted.
Figure 8:
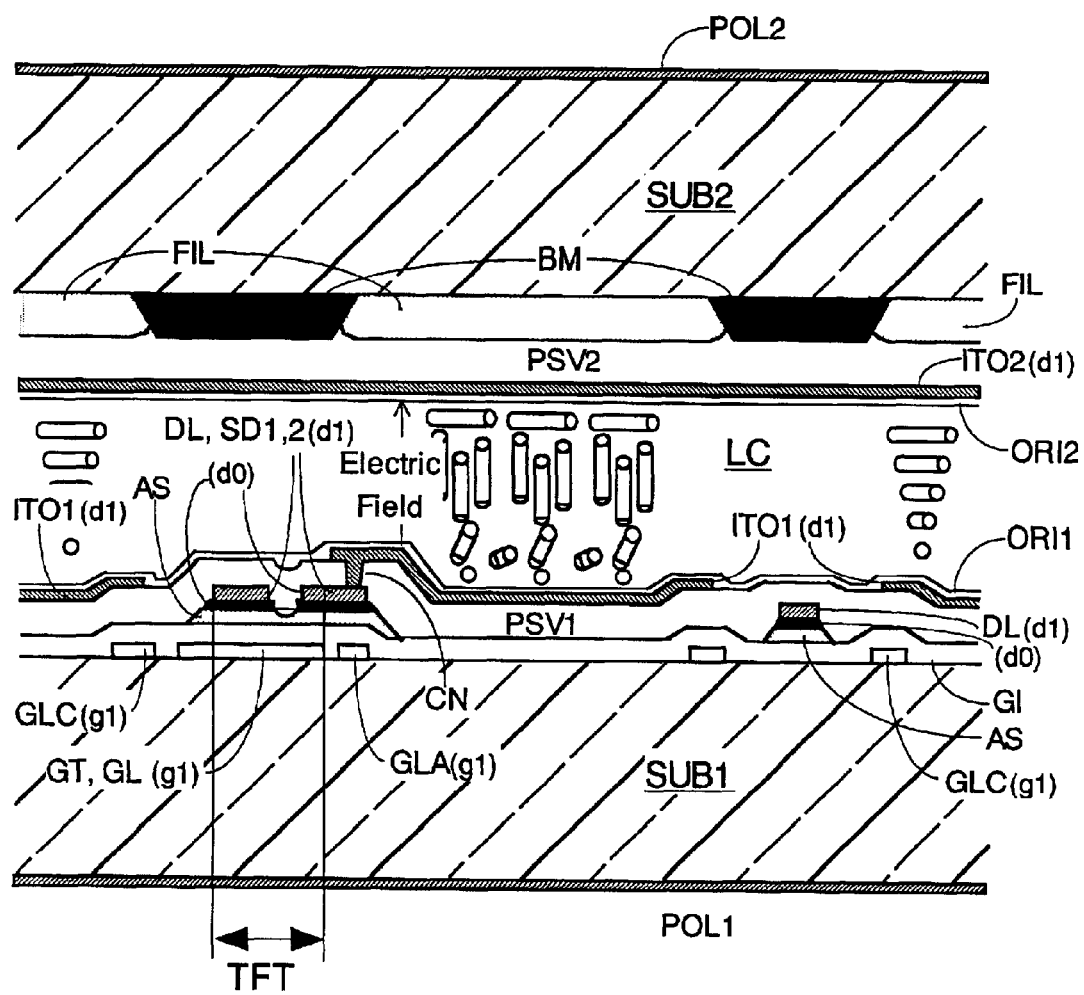
FIG. 8 is a cross-sectional view showing a cross section of the liquid crystal display panel shown in FIG. 7 taken along a line A–A'.

FIG. 7 is a plan view for explaining the constitution of one pixel of the liquid crystal display panel having the thin film transistor and the periphery thereof and FIG. 8 is a cross-sectional view taken along a line A–A' of FIG. 7.

As shown in FIG. 7, each pixel region PX is mainly constituted of a pixel electrode ITO1 which is arranged in an intersecting region which is defined by two neighboring scanning signal lines (also called "gate signal lines" or "horizontal signal lines") GL and two neighboring video signal lines (also called "drain signal lines", "vertical signal lines" or "data signal lines") DL (in the inside of a region surrounded by four signal lines).

In FIG. 7, second scanning signal lines (bypass lines) GLA are formed along respective scanning signal lines GL and scanning signals are transmitted through the second signal lines GLA when the scanning signal lines GL are disconnected. Respective scanning signal lines GL and the corresponding second scanning signal lines GLA are arranged such that they surround the pixel electrode ITO1. Conductive layers GLC which electrically connect both scanning signal lines are extended along both ends of the pixel electrode ITO1 which face video signal lines DL and face end portions of the pixel electrode in an opposed manner through a first insulation layer and a second insulation layer (also called protection films or passivation films). By partially superposing the conductive layers GLC and the pixel electrode ITO1, it becomes possible to suppress the leaking of light of the pixel region PX which is induced by the irregularities of the arrangement of liquid crystal molecules derived from the fringe field generated at the end portions of the pixel electrode. Further, charges supplied to the pixel electrode ITO1 can be retained in the pixel electrode so that the lowering of the brightness of the pixel region PX in the image display period (1 frame period) can be suppressed (functioning as the holding capacity).

The above-mentioned second scanning signal lines GLA and conductive layers GLC and a gate electrode GT of a thin film transistor which will be explained later are formed of a conductive layer which is made of metal or alloy or the combination of these materials identical with that of the scanning signal lines GL. Here, in this embodiment, on a main surface of one substrate SUB1 of a pair of substrates which sandwich a layer LC made of liquid crystal compound (liquid crystal layer) therebetween, an aluminum (Al) layer and a chromium (Cr) layer are laminated in this order so as to form the scanning signal lines GL, the second scanning signal lines GLA, the conductive layer GLC and the gate electrode GT.

As shown in FIG. 8, video signal lines DL are formed by laminating semiconductor layers AS and a conductive layer d1 made of metal, alloy or a combination of them in this order on a first insulation film GI which is formed such that the first insulation film GI covers the above-mentioned scanning signal lines GL, the second scanning signal lines GLA, the conductive layers GLC and the gate electrode GT. In this embodiment, the first insulation film GI is made of silicon nitride ($SiN_x$), the semiconductor layer AS is made of amorphous silicon (a-Si) and the conductive layer d1 is made of a chromium layer. Further, in the vicinity of a boundary of the semiconductor layer AS which comes into contact with the conductive layer d1, an n-type semiconductor layer d0 which contains a large amount of n-type impurities compared to other portions of the semiconductor layer AS is formed so that the semiconductor layer As and the conductive layer d1 are brought into an ohmic contact. In this embodiment, the above-mentioned gate electrode GT is formed by expanding one of corners where the scanning signal line GL made of the conductive layer g1 and the above-mentioned conductive layer GLC are connected.

On the other hand, the semiconductor layer AS is extended over the gate electrode GT as well as the second scanning signal line GLA which is close to the gate electrode GT. Further, the conductive layer d1 is branched from the video signal line DL and is extended over the gate electrode GT. Here, the conductive layer d1 faces another conductive layer d1 in an opposed manner with a given gap therebetween. Over the semiconductor layer AS, another conductive layer d1 is extended along the extending direction of the semiconductor layer AS from a position above the gate electrode GT to a position above the second scanning signal line GLA. Over the gate electrode GT, the conductive layer d1 which is branched from the video signal line DL functions as either one of a source electrode and a drain electrode of a thin film transistor TFT and another conductive layer d1 functions as the other of the source electrode and the drain electrode of the thin film transistor TFT. In this specification, for the convenience sake, the former conductive layer d1 is called a drain electrode SD2 and the latter conductive layer d1 is called a source electrode SD1. At a boundary which is brought into contact with the source electrode SD1 and the drain electrode SD2 of the semiconductor layer AS respectively, n-type semiconductor layers d0 which contains a large amount of n-type impurities compared to other portions are respectively formed so as to bring the semiconductor layer AS and the source electrode SD1 and the drain electrode SD2 respectively into the ohmic connection.

The n-type semiconductor layer d0 which is formed on the thin film transistor TFT is divided into a source electrode SD1 side and a drain electrode SD2 side corresponding to a gap which separates the source electrode SD1 and the drain electrode SD2. Accordingly, the source electrode SD1 and the drain electrode SD2 are electrically connected in response to the value of voltage applied from the gate electrode GL through the semiconductor layer AS which is positioned below the source electrode SD1 and the drain electrode SD2. A region of the semiconductor layer AS which is positioned in the gap which separates the source electrode SD1 and the drain electrode SD2 functions as a channel of the thin film transistor TFT. Here, the first insulation film GI functions, in the thin film transistor TFT, such that the gate electrode GT and the semiconductor layer AS which constitutes a channel of the gate electrode GT are electrically separated and only an electric field from the gate electrode GT is applied to this channel and hence, the first insulation film GI is also called a gate insulation film. Further, in this embodiment, the above mentioned source electrode SD1 (another conductive layer d1) is formed of material equal to that of the video signal line DL.

The pixel electrode ITO1 is formed on an upper surface of the second insulation film PSV1 (also called protection film, or passivation film) which is formed such that the second insulation film PSV1 covers the video signal line DL, the source electrode SD1 and the drain electrode SD2. An opening CN which exposes an upper surface of the source electrode SD1 formed on the above-mentioned second scanning signal line GLA is formed in the second insulation film PSV1 and, as shown in FIG. 8, a portion of the pixel electrode ITO1 is electrically connected to the source electrode SD1 through this opening CN.

The pixel electrode ITO1 is formed of conductive material such as Indium-Tin-Oxide (ITO), Indium-Zirconium-Oxide (IZO) or the like which exhibits optical transmissivity higher than that of the above-mentioned metal layer or the alloy layer. Hereinafter, this type of conductive material is called transparent conductive material for the convenience sake. As shown in FIG. 7, the pixel electrode ITO1 of this embodiment is connected to a source electrode SD1 of a thin film transistor TFT which is formed in a pixel region PX" which is arranged close to the pixel region PX where the pixel electrode ITO1 is formed in the extending direction of the video signal lines DL (the region which is surrounded by a pair of neighboring scanning signal lines GL and a pair of neighboring video signal lines DL . . . one of the scanning signal lines and one of the video signal lines not shown in the drawing). Accordingly, the scanning signal line GL' and the second scanning signal line GLA which are superposed on the periphery of the pixel electrode ITO1, irrelevant to the video signal control on the pixel electrode ITO1 positioned at the pixel region PX, control the video signals supplied to the pixel electrode positioned at the neighboring pixel region PX' (disposed at the opposite side of the pixel region PX"). Accordingly, the scanning signal line GL' and the second scanning signal line GLA which are superposed on the periphery of the pixel electrode ITO1 at the pixel region PX, in the same manner as the above-mentioned conductive layer GLC, prevent the leaking of light in the pixel region or function as a holding capacity of the pixel electrode ITO1.

An orientation film (orientation control film) ORI1 made of resin such as polyimide or the like is formed on upper surfaces of the pixel electrode ITO1 and the second insulation film PSV1. The orientation film ORI1 is formed by applying the rubbing treatment to a resin film or by irradiating laser beams to the resin film and determines the orientation direction of liquid crystal molecules (schematically indicated in a cylindrical shape in FIG. 8) in the inside of the liquid crystal layer LC.

On another main surface of the substrate SUB1 which is disposed opposite to the main surface on which the thin film transistor and the like are formed in an opposed manner (the main surface which does not face the liquid crystal layer LC), a polarization film POL1 is adhered and the light transmitting conditions are determined based on the combination of the polarization axis of the polarization film POL1 and the orientation direction of the liquid crystal molecules.

On the other hand, on a main surface of the other substrate SUB2 of a pair of substrates, a black matrix BM which is made of material having the low optical transmissivity and has openings which correspond to the above-mentioned pixel regions PX provided to one substrate SUB1 and color filter layers FIL are mounted in the openings. Surfaces of the black matrix BM and the color filter layer FIL which are disposed opposite to the substrate SUB2 are covered with an insulation film (also called passivation film or overcoat film) PSV2 so that the irregularities which appear in every opening of the black matrix are made uniform.

On an upper surface (a lower surface in FIG. 8) of the insulation film PSV2, a counter electrode ITO2 (also called "common electrode" or "reference electrodes") is formed and an orientation film ORI2 is formed on an upper surface of the counter electrode ITO2 in the same manner as the substrate SUB1. The counter electrode ITO2 is made of transparent conductive material in the same manner as the above mentioned pixel electrode ITO1 and the counter electrode ITO2 is formed such that the counter electrode ITO2 covers a plurality of pixel electrodes ITO1 with the liquid crystal layer disposed therebetween.

Also with respect to the other substrate SUB2 of a pair of substrates, a polarization film POL2 is adhered to a main surface which does not face the liquid crystal layer LC in an opposed manner and the polarization film POL2 determines the light transmission conditions based on the combination of the polarization axis of the polarization film POL2 and the orientation direction of the liquid crystal molecules.

While the potential of the pixel electrode ITO1 is changed every second in response to the video signals supplied from the video signal line DL and the switching of the thin film transistor TFT which is performed based on the scanning signal line GL, the potential of the counter electrode ITO2 is held at a given value (when the liquid crystal display device is driven using a dot inversion method).

Three kinds of pixel electrodes ITO1 are shown in FIG. 8. In the drawing, only to the central pixel electrode ITO1, a voltage which generates the potential difference which can change the orientation of the liquid crystal molecules positioned between this pixel electrode ITO1 and the above-mentioned counter electrode ITO2 is applied. Accordingly, the light which is propagated from the central pixel electrode ITO1 to the counter electrode ITO2 which faces the central pixel electrode ITO1 in an opposed manner is shielded by the liquid crystal layer LC. To the contrary, between the pixel electrodes ITO1 which are respectively partially shown at the left and the right and the counter electrode ITO2, the potential difference which can change the orientation of the liquid crystal molecules positioned between these electrodes from the orientation state derived from the orientation films ORI1, ORI2 is not generated and hence, the light is propagated from the respective pixel electrodes ITO1 to the counter electrode which faces these pixel electrodes ITO1 in an opposed manner through the liquid crystal layer LC. The liquid crystal display device which is operated in this manner is called the liquid crystal display device of a normally white mode (allowing light to be transmitted when the signal voltage is not applied to the pixel electrodes). On the other hand, the liquid crystal display device which allows light to be transmitted by applying the signal voltage to the pixel electrodes is called the liquid crystal display device of a normally black mode.

In the liquid crystal display panel having the pixel region PX which has been explained heretofore in conjunction with FIG. 7 and FIG. 8, one substrate SUB1 of a pair of substrates which constitute the liquid crystal display panel is provided with the thin film transistor on one of the main surfaces thereof and hence, the substrate SUB1 is called a TFT substrate. On the other hand, the other substrate SUB2 of a pair of substrates is provided with the above-mentioned color filter layers FIL on one of the main surfaces thereof and hence, the other substrate SUB2 is called a color filter substrate. Although the color filter layers FIL and the thin film transistor TFT are respectively formed on another substrates in this embodiment, the thin film transistor TFT may be formed on the above-mentioned color filter substrate together with the color filter layers FIL or the color filter layers may be formed on the TFT substrate in the opposite manner. In this specification, the substrate which is provided with the color filter layers FIL on the main surface thereof is defined as a color filter substrate.

Subsequently, the general manner of assembling the liquid crystal display device using the liquid crystal display panel PNL having the pixel regions shown in FIG. 7 and FIG. 8 formed at a plural positions is explained in conjunction with FIG. 9.

Figure 9A:
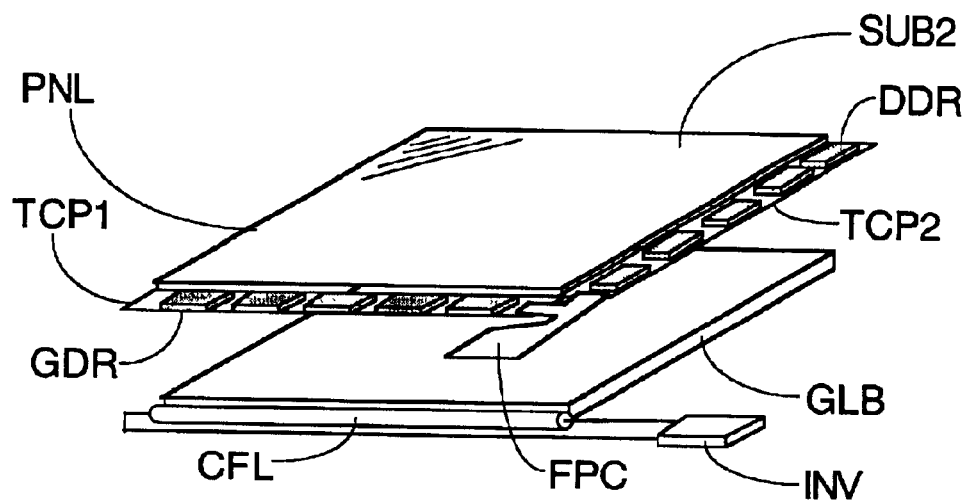

FIG. 9A is a perspective view which shows a liquid crystal display device which is constituted by combining the liquid crystal display panel PNL having the pixel regions shown in FIGS. 7 and 8 formed at a plural positions and a light source unit (backlight system) having a cold cathode ray tube (a kind of fluorescent lamp) CFL from the other substrate SUB2 side of a pair of substrates which constitute the liquid crystal display panel.

On one of a pair of sides which face each other in an opposed manner of a pair of substrates SUB1, SUB2 which constitute the liquid crystal display panel PNL, a plurality of scanning signal line driving circuits GDR which are mounted on a tape carrier package TCP1 are formed. Voltage signals (scanning signals) are supplied to a plurality of respective scanning signal lines GL which have portions thereof shown in FIG. 7, the second scanning signal lines GLA, the conductive layer GLC and the gate electrode GT which are electrically connected with the scanning signal lines GL from any one of these scanning signal line driving circuits GDR. On the other hand, on one of the other pair of sides which face each other in an opposed manner (extending in the direction which intersects the extending direction of the above-mentioned pair of sides) of a pair of substrates SUB1, SUB2, a plurality of video signal line driving circuits DDR which are mounted on a separate tape carrier package TCP2 are formed. Voltage signals (video signals) are supplied to a plurality of respective video signal lines DL which have portions thereof shown in FIG. 7 from any one of these video signal line driving circuits DDR. A flexible printed circuit board FPC is connected to these tape carrier packages TCP1, TCP2. A timing converter or a circuit element (not shown in the drawing) corresponding to the timing converter which controls the operations of the above-mentioned scanning signal line driving circuits GDR and video signal line driving circuits DDR is mounted on the flexible printed circuit board FPC. The control signals for the scanning signal line drive circuits GDR and the video signal line driving circuits DDR relating to the image display in the liquid crystal display panel and the operation power for these driving circuits are supplied to the respective driving circuits from the flexible printed circuit board FPC through the tape carrier package on which respective driving circuits are mounted.

On the other hand, in the liquid crystal display device shown in FIG. 9A, the backlight system which irradiates light to the liquid crystal display panel PNL has a so-called side light (edge light) type constitution. That is, the backlight system includes a light guide plate GLB which has one surface thereof arranged to face the liquid crystal display panel PNL in an opposed manner and a cold cathode ray tube CFL (kind of a fluorescent tube) which is arranged to face at least one of side surfaces of the light guide plate in an opposed manner. Also not shown in the drawing, between the light guide plate GLB and the liquid crystal display panel PNL, an optical sheet such as a diffusion sheet, a prism sheet or the like is usually arranged. Further, in a small-sized liquid crystal display device such as a portable telephone or a PDA (portable digital assistance) or the like, a light emitting diode (LED) or an electroluminescence (EL) element or the like is mounted in place of the above-mentioned cold cathode ray tube as a light source. In any one of these cases, when the light emitted from the light source (the cold cathode ray tube CFL in FIG. 9A) is incident on the side surface of the light guide plate GLB, the light is reflected on a pattern formed on a lower surface of the light guide plate GLB and is emitted from an upper surface of the light guide plate GLB toward a lower surface of the liquid crystal display panel PNL. When the cold cathode ray tube CFL is used as the light source, an inverter circuit INV is provided as a driving power source thereof. Among respective cables which are extended from the inverter circuit INV to a pair of electrodes provided to the cold cathode ray tube CFL, the cable which is coupled to one electrode of the cold cathode ray tube CFL which is set to the ground potential (or the reference potential) is longer than the cable to which voltage (as an absolute value) which is higher than the ground potential is applied and is coupled to the other electrode.

Figure 9B:
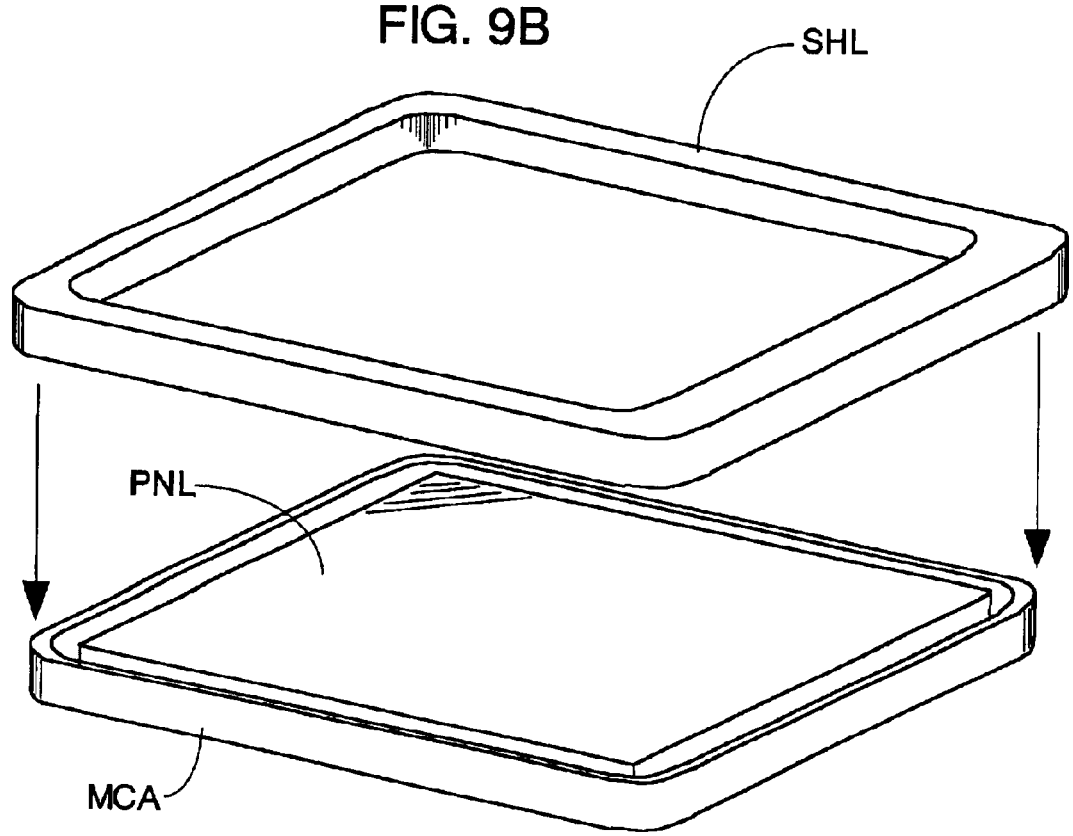

With respect to the liquid crystal display device shown in FIG. 9A, as shown in the perspective view of FIG. 9B, the backlight side (the lower side in FIG. 9B) of the liquid crystal display device is fixedly secured to a mold frame MCA and then a shield case SHL is formed to cover the liquid crystal display device and the mold frame MCA from the liquid crystal display panel side (the upper side in FIG. 9B) thus assembling the liquid crystal display device. With respect to the small-sized liquid crystal display device which is used in the portable telephone or the PDA, since an accommodating space thereof is limited, the above-mentioned shield case is omitted in many cases.

<<Composition of color filter inks>>

Figure 6A:
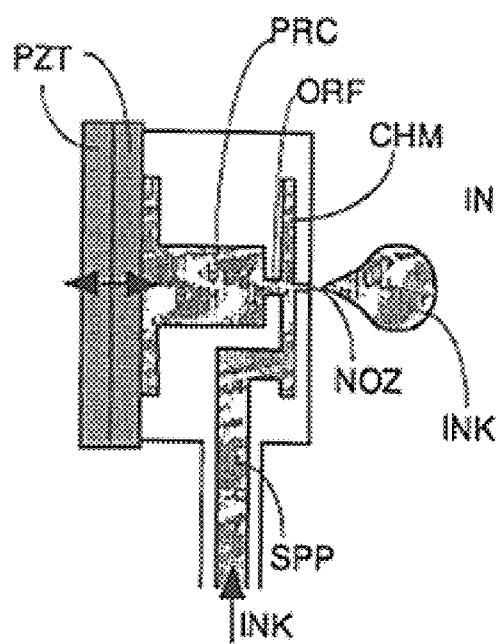
Figure 6B:
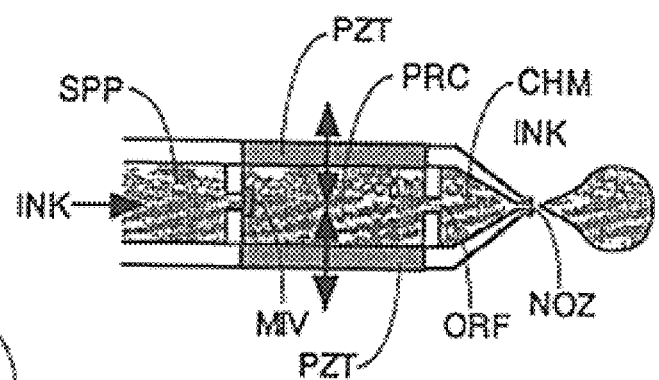
Figure 6C:
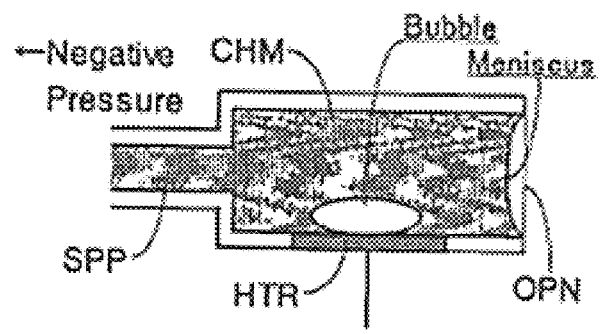

According to "Chapter 16. Water Ink for Inkjet Recording" of "Technologies & Materials for Inkjet Printer" (pages 201–213), ink used in an inkjet type ink supply device adopting a piezoelectric method (see inkjet printer in FIG. 6A and FIG. 6B) is prepared by suitably mixing water ($H_2O$) as solvent or a dispersing agent, a coloring agent, a drying preventing agent, a penetrant, a preservative and antifungal agent, resin and the like. The main usage of the ink disclosed in the literature is printing on paper. On the other hand, Japanese Laid-open Patent Publication 209669/1999 discloses a technique which prepares ink which is specifically used for the manufacturing of a color filter substrate by mixing 1 to 40 percent of pigment or dye, 1 to 40 percent of wetting agent (polyhydric alcohol) and 1 to 40 percent of penetrant (lower alcohol, drying preventing agent) into water or a water-soluble organic solution as solvent. This publication further states that, by respectively preparing the compositions of the pigment or the dye, the wetting agent and the penetrant contained in the color filter ink in the above-mentioned ranges and the composition of the solvent in a range of 5–95 percent, the physical properties (viscosity, surface tension and contact angle) can be set to values which are suitable for preventing the clogging of nozzles of an ink supply device of the inkjet-type and for maintaining the flight linearity toward the color filter substrate. Further, this publication discloses glycerin and diethylene glycol as the specific wetting agent, ethanol and isopropyl alcohol as the specific penetrant, and water, N, N-dimethylformamide and 1,3-dimethyl-2-imidazolidinone as the specific solvent. This publication also discloses that acrylic resin is added to the above-mentioned composition as a dispersing agent.

To the contrary, in the present invention, the composition ratios of the ink are adjusted such that the ink includes the dye in a range of 1 to 5 percent, a volatility-adjusting agent (wetting agent) in a range of 1 to 40 percent, a dyeing promoter agent in a range of 1 to 30 percent, and solvent in a range of 10 to 80 percent. These composition ratios are defined as the weight percent. With respect to the materials which constitute the ink of the present invention, when a commercially available water-soluble dye is used as the dye, glycerin is used as the volatility-adjusting agent, for example, N-methyl-2-pyrrolidone or γ-butyrolactone is used as the dyeing-promoter agent, for example, and water is used as the solvent for example,.

As the volatility-adjusting agent, glycerin (glycerol, or glycyl alcohol, $CH_2OHCHOHCH_2OH$) of a relatively low molecular weight which has a following chemical formula is used.

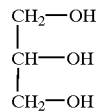

Glycerin can suppress the solidification of the ink so as to suppress the clogging of the nozzle of the inkjet type ink supply device (see FIG. 6A, FIG. 6B) and forms the meniscus on the liquid surface of the ink at the opening of the nozzle into shapes which are respectively desirable at the time of supplying the ink and at the time of stopping the supply of the ink respectively. Accordingly, in place of glycerin, material which has the higher boiling point than the solvent and has the larger viscosity than the solvent in the same manner as glycerin may be used. Although the size (quantity) of the droplets of the ink ejected from the nozzles can be changed corresponding to the manner of supplying the ink to the color filter substrate, the desirable shape of the meniscus of the liquid surface of the ink at the openings of the nozzles may be changed with respect to this quantity of droplets of the ink. Accordingly, the composition ratio of the volatility-adjusting agent (glycerin) in the inside of the ink is also changed in response to the shape of the meniscus.

Figure 1:
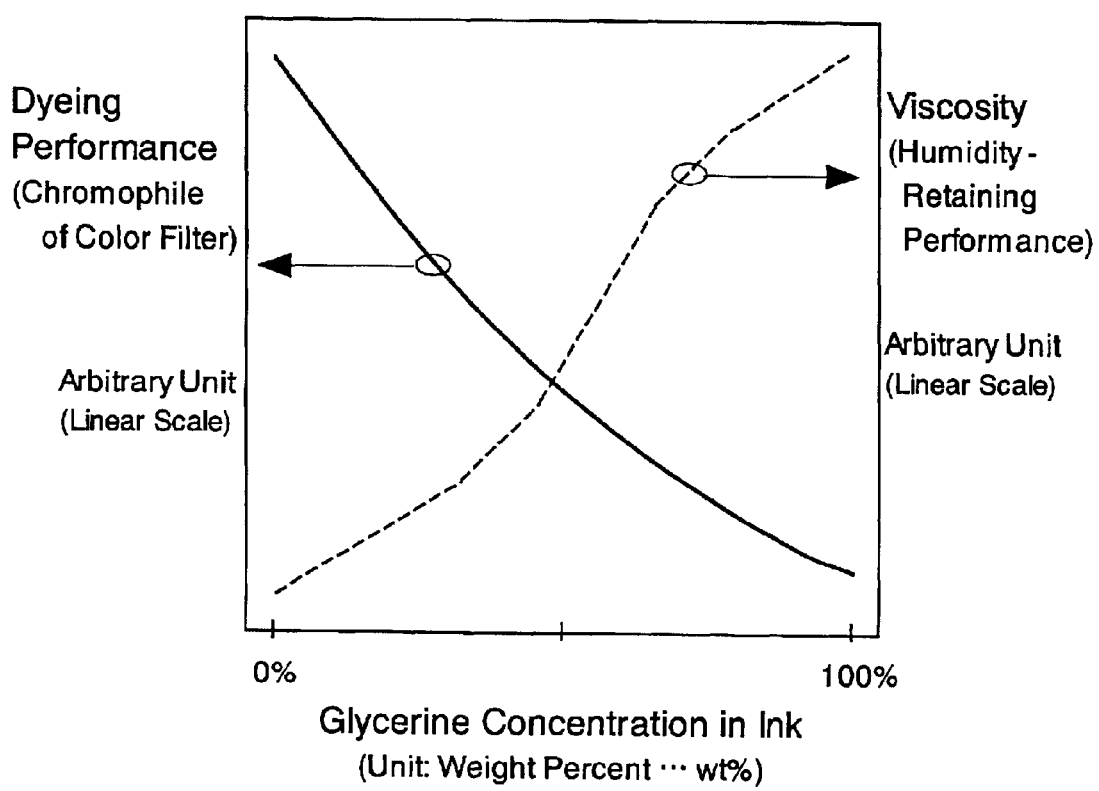
FIG. 1 is a graph showing the composition ratio of glycerin (volatility-adjusting agent) which is contained in a color filter ink according to the present invention and the dyeing performance and drying property of the ink.

Although the above-mentioned advantageous effect can be obtained by making ink contain the volatility-adjusting agent therein, when a content of the volatility-adjusting agent exceeds a certain level, it becomes difficult for the dye to permeate into the dyed media (material to be the color filter) on the color filter substrate and hence, there arises a problem that it is difficult to dye the dyed media at a given concentration (the color concentration of the color filter is decreased) . . . see graph on dyeing performance (chromophile of color filter) in FIG. 1. . . . The chromophile of the dyed medium (the dyeing performance of the ink) is evaluated by e.g. an optical measurement of color concentration of the dyed medium (the color filter layer). On the other hand, the viscosity of the volatility-adjusting agent increases the viscosity of the ink per se and hence, the drying of the ink liquid surface adhered to the opening of the nozzle of the ink supply device and the surface of the dyed media on the color filter substrate can be suppressed. In other words, the evaporation of the solvent from the ink liquid surface can be suppressed so as to retain the humidity-see graph on humidity-retaining performance in FIG. 1. . . . However, when the excessive humidity-retaining performance is given to the ink, the drying of the ink on the surface of the dyed media is delayed and hence, there arises a problem that the processing steps of the color filter substrate cannot be started after coloring the dyed media. Accordingly, in view of the trade-off relationship between the permeation of the dye into the dyed media of the color filter and the coloring time, the prevention of the clogging of the nozzle of the ink supply device and the shortening of the waiting time from the completion of the coloring of the dyed media to the starting of the processing of the color filter substrate, it is preferable to set the composition ratio of the volatility-adjusting agent in the ink in a range from 1 to 40 percent. As the volatility-adjusting agent other than glycerin, dimethyl sulfoxide (also described as DMSO, $(CH_3)_2SO$) or sodium lactate ($CH_3CHOHCOONa$) can be used.

On the other hand, N-methyl-2-pyrrolidone used as the dyeing-promoter agent has been, as described on page 207 of "Technologies & Materials for Inkjet Printer", conventionally recognized as the drying prevention agent (wetting agent) in the same manner as glycerin. However, the inventors of the present inventions have found based on an experiment that N-methyl-2-pyrrolidone includes a hydrophilic portion and a hydrophobic portion such as N-methyl-2-pyrrolidone and γ-butyrolactone in the molecule and the organic material which has a spatial expansion in the hydrophobic portion promotes the permeation of the dye into the dyed media.

N-methyl-2-pyrrolidone ($C_3H_9NO$) has a following molecular structure.

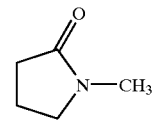

Further, γ-butyrolactone ($C_4H_6O_2$) has a following molecular structure.

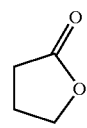

Both molecular structures have a five-membered ring having carbon (C) as a main constituent element and one element which constitutes the five-membered ring is formed of an element (nitrogen (N) or Oxygen (O)) having the number of valence electrons larger than that of carbon. The carbon and the element having the number of valence electrons larger than that of carbon, both of which constitutes the five-membered ring, are each bonded by a single bond. As described in "Chapter 20: Derivatives of Carboxylic Acid (page 833)" of "Organic Chemistry (middle volume), the Third Edition" written and edited by R. T. Morrison, & R. N. Boyd and translated by Kouji Nakanishi et al (Published by Tokyo Kagaku Dojin, 1977), lactone series are characterized as compounds which contain ester linkage in the ring. Pyrrolidone series are also characterized as compounds which contain peptide linkage in the ring. The derivatives of pyrrolidone are characterized as compounds in which N-H bonding of peptide linkage contained in the ring is modified by the alkyl group (for example, methyl group).

The inventors of the present invention have found that when the ink is made to contain these organic materials, the dyeing concentration of the dyed media which are formed in the color filter substrate is increased. Materials which have been conventionally known as materials (penetrants) for promoting the coloring of the material to be colored with ink are, as described on page 208 of "Technologies & Materials for Inkjet Printers", classified and exemplified as three kinds of materials, that is, material which partially erodes the material to be colored and increases the affinity of ink for the material to be colored (media dissolution type: caustic potash (KOH), for example), material which decreases the surface tension of ink on the surface of the material to be colored (surface tension reduction type: alkylbenzene sulfonates or polyoxyethylene alkylphenol, for example) and material which promotes the drying of ink on the surface of the material to be colored (evaporation combined use type: ethanol, for example). However, none of these materials have succeeded in obtaining the favorable effect with respect to the coloring of the dyed media formed in the color filter substrate.

In general, the material to be colored (dyed medium) which is formed in the color filter substrate is constituted of resin such as acrylic resin, gelatin resin, casein resin or the like which is produced by polymerizing high-molecular material in a three dimensional manner. Accordingly, the concentration of molecules in the inside of the material to be colored is high compared with paper (aggregate of cellulose) or the like and hence, there has been a problem that the permeation of the dye into the inside of the material to be colored is difficult. Further, as shown in FIG. 8, after completing the color filters FIL by coloring the dyed media on the color filter substrate SUB2 with the dye, the protection film PSV2, the counter electrode ITO2 and the orientation film ORI2 are formed in sequence such that they cover the color filters FIL. Accordingly, to prevent the dispersion of the residual dye which remains on the surfaces of the color filters FIL into the protection film PSV2 or to prevent the permeation of the residual dye into the liquid crystal layer LC through the counter electrode ITO2 and the orientation film ORI2, the color filter substrate has been cleaned after coloring the color filters FIL. In such a situation, the coloring of the dyed media using the conventional penetrant (classified into the media dissolution type, the surface tension reduction type and evaporation combined use type) is performed exclusively for adhering the dye to the surface of the dyed media and is not intended to make the dye permeate into the dyed media and hence, the dye is randomly peeled off from the dyed media in the cleaning step or the like which is performed after the coloring of the color filters FIL thus spoiling the uniformity of the coloring concentration of the color filters FIL after the completion of the color filter substrate.

On the other hand, according to the present invention, with the use of the above-mentioned N-methyl-2-pyrrolidone or γ-butyrolactone, the dye can be more efficiently permeated into the inside of the dyed media than the conventional penetrant. That is, in place of the conventional penetrant, the present invention makes the color filter coloring ink contain an additive called the dyeing-promoter agent (called the dyeing-accelerator Agent, also). According to the observation of the inventors of the present invention on the action of the dyeing-promoter agent, a plurality of dyeing-promoter agent molecules are considered to coordinate respective hydrophilic portions thereof (e.g. peptide linkage therein) toward the dye molecule (or, the dye) and to form a so-called micelle centering the dye molecule (or, the dye) in the micelle itself. Moreover, assuming that the dyeing-promoter agent directs respective hydrophobic portions thereof (e.g. exhibiting lipophilic) toward the surface of the micelle, the whole micelle as one hydrophobic molecule is considered to enter among the molecules of the dyed medium. This observation is based on a phenomenon that, in the coloring step of the dyed medium (color filter FIL) using the ink according to the present invention, the dyed medium is swelled more than expected. The inventors of the present invention also consider that the hydrophobic characteristic of the micelle broadens a space between the molecules of the dyed medium to penetrate into the dyed medium quickly.

Further, the fact that, for the dyed medium such as acrylic resin, gelatin resin or the like which locally includes portions exhibiting hydrophilic property such as ester linkage, peptide linkage or the like in the molecules (macro-molecules), N-methyl-2-pyrrolidone or γ-butyrolactone which is used as the dyeing-promoter agent includes peptide linkage and ester linkage in the inside of the molecule also increases the affinity between the dyed medium and the dyeing-promoter agent so that the permeation of the dye into the inside of the dyed media is accelerated. For example, even when four-membered ring, six-membered ring or seven-membered ring having ester linkage or peptide linkage (caprolactam $C_6H_{11}NO$, for example) is used in place of N-methyl-2-pyrrolidone or γ-butyrolactone having the five-membered ring, the advantageous effects intended by the present invention can be obtained. Further, with respect to compounds having ester linkage or peptide linkage, to compare the molecular structures of these compounds, it is preferable to use substance which has side chains longer than the straight chain structure as the dyeing-promoter agent. It is further preferable to use substance which has the ring structure as the dyeing-promoter agent.

Accordingly, on the assumption that the molecules of the dyeing-promoter agent are coordinated in the dye molecules in the coloring step of the color filters FIL, it is recommendable to use the compound having the molecular structure which is expanded in two dimensions compared to straight chain molecules as the dyeing-promoter agent. Here, the compounds which are used as the above-mentioned volatility-adjusting agent or the dyeing-promoter agent may be suitably transformed into other compounds depending on the kind of solvent into which the dye is dispersed. When the solvent is low alcohol or aldehyde, elements which constitute the ester linkage or the peptide linkage of the dyeing-promoter agent may be modified by the alkyl group. When the dyeing-promoter agent or the dyed medium includes the peptide linkage or ester linkage, the material exhibits characteristic peaks in the nuclear magnetic resonance spectrum and the infra red spectrum. With respect to the compositions of the dye, the volatility-adjusting agent, the dyeing-promoter agent and the solvent in the ink, respective weight percent values of respective materials can be specified based on the respective peak areas thereof in view of the difference of retention times of the peaks appearing in the spectra using a gas chromatography analyzer. Further, the ink according to the present invention may generate colloid when the ink is dropped into the phosphoric solvent (oil or the like).

As other criteria for selecting compounds which can be used as the dyeing promoter agent, it is preferable to focus on a point that the boiling point (corresponding to the volatility) of the dyeing-promoter agent is higher than that of the volatility-adjusting member and is higher than that of the solvent or a point that the viscosity of the dyeing-promoter agent is lower than that of the volatility-adjusting agent. In an example which combines glycerin as the volatility-adjusting agent and N-methyl-2-pirrolidone as the dyeing-promoter agent, the boiling point of the former is 290° C. and the boiling point of the latter is 202° C. Further, with respect to the viscosity, a capillary is prepared by processing a glass tube, given quantities of respective liquids are filled in the capillary under the same environment (conditions such as temperature, humidity, atmospheric pressure or the like at the time of an experiment being set equal), and the magnitude of the viscosity was confirmed by measuring the time necessary for respective liquids to pass through the capillary. The volatility-adjusting agent which composes the ink according to the present invention is required to perform the function of suppressing the drying of ink within a period from a point of time that the ink is adhered to the surface of the dyed media to the point of time that the dye contained in the ink permeates into the inside of the dyed media to some extent. Further, the volatility-adjusting agent which composes the ink according to the present invention is required to perform the function of preventing the scattering of the ink in the process for ejecting the ink toward the surface of the dyed medium from the nozzle of the ink supply device. To take these request into consideration, it is requested that the boiling point of the volatility-adjusting agent is elevated above a given level with respect to the former request and it is requested that the viscosity of the volatility-adjusting agent is increased above a given level with respect to the latter request. However, these limitations may be alleviated depending on the improvement of the permeation characteristics of the dye into the inside of the dyed media due to the dyeing-promoter agent and the enhancement of the nozzle shape of the ink supply device. That is, even when the combination of respective reagents used as the volatility-adjusting agent and the dyeing-promoter agent does not satisfy either one or both of these conditions, there still exists a possibility that an advantageous effects intended by the present invention can be obtained.

The composition ratio of the volatility-adjusting agent in the ink according to the present invention can be suitably adjusted in accordance with the size of the droplets of the ink ejected from the nozzle of the ink supply device. Since the inkjet type ink supply device is universally applicable from the manufacturing of a small-sized color filter substrate (the diagonal size of the substrate being not more than 5 cm) which is assembled into a liquid crystal display device for a portable telephone to the manufacturing of a large-sized color filter substrate (the diagonal size of the substrate being not less than 40 cm) which is assembled into a liquid crystal display device for a video wall or a wall-hanging television set, the volume of the droplets of ink ejected from the nozzle covers a wide range of 1 pL (pico liter, $10^{-9}$ liter) to 100 pL ($10^{-7}$ liter). However, since the surface area of the droplets of the ink is changed corresponding to the volume of the droplets of the ink, it is desirable to adjust the composition ratio in accordance with the characteristics of the nozzle of the ink supply device and the usage or the application of the color filter substrate which is manufactured by using such an ink supply device.

As described above, the composition ratio of the volatility-adjusting agent covers a range of 1 to 40 percent (the value by weight percent, that is, the composition ratio being expressed by the weight percent unless otherwise specified) with respect to the total weight of the ink. However, when the ink supply device disclosed in Japanese Laid-open Patent Publication 209669/1999 (ink being ejected as a droplet having the volume of 4 pL according to the experiment carried by the inventors of the present invention) is used, it is preferable to set the composition ratio in a range from 5 to 20 percent. Although the volume of the droplets of ink ejected from the nozzle of the ink supply device is described as a nominal value in a catalogue or the like submitted by a maker of the device, this value may be varied depending on the mechanical characteristics of each device and the physical properties of the ink per se (as the mixture of dye, the solvent, the volatility-adjusting agent, the dyeing-promoter agent and the like). For example, the volume of the droplet of ink corresponding to the above-mentioned composition ratio 5 to 20 percent may be expanded in a range of 3–5 pL or in a range of 2–6 pL. Further, when the volume of the droplet of ink is increased to take the value around 30 pL (20–40 pL), the range of desirable composition as the volatility-adjusting agent is shifted to a range of 30 to 40 percent.

On the other hand, it is preferable to set the composition ratio of the solvent in the ink according to the present invention such that the solvent is dispersed in the ink without spoiling the above-mentioned advantageous effects of the volatility-adjusting agent and without precipitating the dye in the ink. In compounding the ink according to the present invention, in many cases, the affinity which the dye exhibits to the volatility-adjusting agent is smaller than the affinity which the dye exhibits to the solvent and the dyeing-promoter agent. Accordingly, although the composition ratio of the solvent in the Ink covers a range of 10 to 80 percent, depending on the combination of the reagent used as the dye and the reagent used as the volatility-adjusting agent, it is preferable to increase this value to 50 to 60 percent. Particularly, when the solvent is water, it is preferable to increase the composition ratio up to 70 percent. However, it is possible to suppress the composition ratio of the solvent in a low range depending on the degree of characteristics such as the hydrophile-lipophile balance which the dyeing-promoter agent exhibits in the ink (since the volatility-adjusting agent is not always lipophilic, the expression "characteristics such as" is used).

The composition of the dyeing-promoter agent in the ink according to the present invention is set within a range of 1 to 30 percent depending on the chemical characteristics thereof, while the composition of the dye in the ink is set within a range of 1 to 5 percent depending on the chemical characteristics thereof.

The detail of the ink according to the present invention which has been explained heretofore depends on the manufacturing method of the color filter substrate using such ink and hence, the ink is described in detail in the explanation relating to this manufacturing method explained later.

<<Color filter substrate and manufacturing method of liquid crystal display device using the color filter substrates>>

Figure 2:
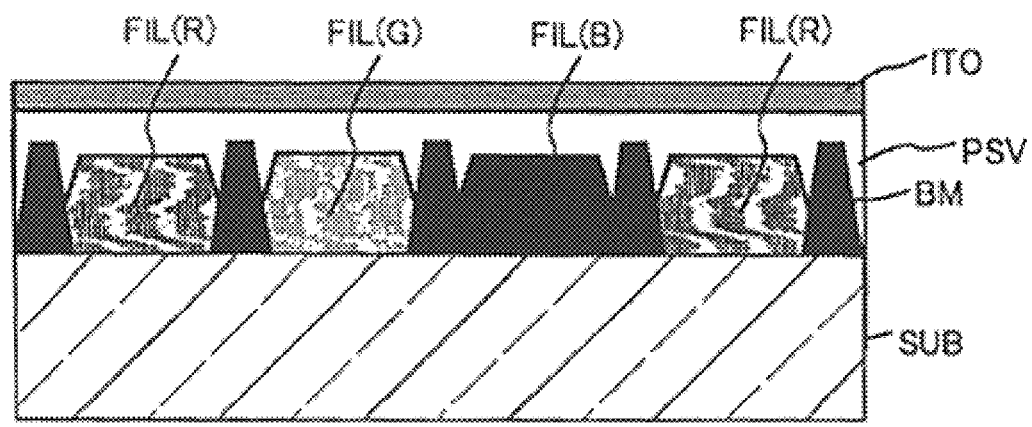
FIG. 2 is a schematic cross-sectional view of a color filter substrate which is manufactured using the ink according to the present invention.

The manufacturing method of color filter substrates is explained in conjunction with FIG. 8 and FIG. 2 which depicts the structure of the color filter substrate SUB2 side which is shown in FIG. 8 in a deformed shape.

As explained previously, as shown in FIG. 8 and FIG. 2, the completed color filter substrate has the substrate (transparent glass substrate, for example) SUB2, the color filters FIL which are formed on one of main surfaces (called "first main surface" hereinafter), the black matrix BM, the passivation film (overcoat layer) PSV2, the electrode (supply electrode) ITO2 made of transparent conductive material such as ITO, IZO or the like, and the liquid crystal orientation control layer (orientation film) ORI2. In FIG. 8 and FIG. 2, when the transparent glass substrates are respectively used as a pair of substrates SUB1, SUB2, the thickness of the substrate SUB1 is set to approximately 1.1 mm, for example, and the thickness of the substrate SUB2 is set to approximately 0.7 mm (thinner than the substrate SUB1), for example. Further, FIG. 2 shows the state in which on one (shown as an upper surface) of the main surfaces of the substrate SUB2, a plurality of color filters FIL which are arranged close to each other while being spaced from each other by the black matrix BM and are colored in colors different from each other are formed. Respective color filters shown in FIG. 2 are colored in any one of colors selected from a group consisting of red, green and blue, wherein the red color filter is indicated as FIL (R), the green color filter is indicated as FIL (G) and the blue color filter is indicated as FIL (B). The above-mentioned ink according to the present invention is used in the step for coloring these three kinds of color filters.

Figure 3:
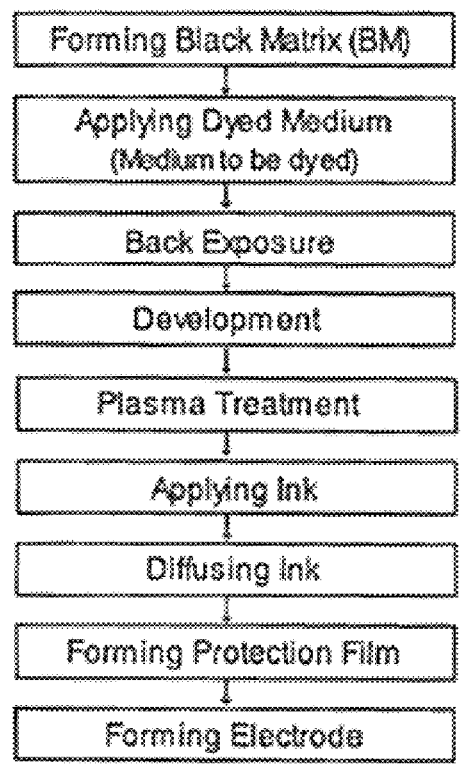
FIG. 3 is a flow chart showing the flow of one example of the color filter manufacturing method according to the present invention.

FIG. 3 shows the flow of the main manufacturing steps of the color filter according to the present invention. Further, FIG. 4A to FIG. 4C and FIG. 5A to FIG. 5C show one example of manufacturing steps in conjunction with FIG. 2. Here, FIG. 4A to FIG. 4C and FIG. 5A to FIG. 5C show the manufacturing steps in series, wherein the ink INK according to the present invention is supplied, as shown in FIG. 5A, to the color filter substrate (in the stage that color filter substrate is not colored) shown in FIG. 4C. The flow of the manufacturing steps described here is substantially similar to the flow of the manufacturing steps disclosed in Japanese Laid-open Patent Publication 281169/1995.

Figure 4A:
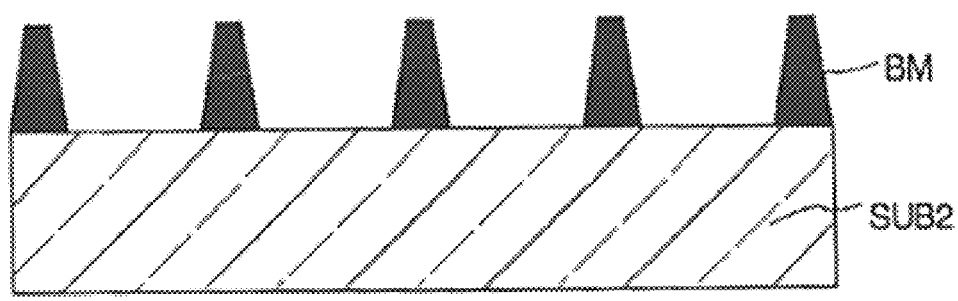
FIG. 4A to FIG. 4C are schematic cross sectional views of the color filter corresponding to the flow of the manufacturing steps of the color filter substrate shown in FIG. 3.
Figure 5A:
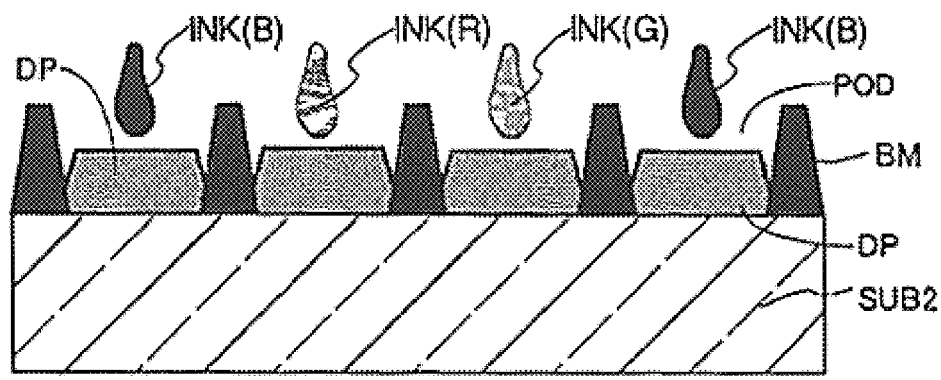
FIG. 5A to FIG. 5C are schematic cross sectional views of the color filter corresponding to the flow of the manufacturing steps of the color filter substrate shown in FIG. 3, wherein these drawings show the processing steps of the substrate shown in FIG. 4C and ensuing drawings.

First of all, as shown in FIG. 4A, the substrate SUB2 is coated with a black resist and an opening pattern is applied to the black resist to form the black matrix BM. Although the material of the substrate SUB2 is suitably selected corresponding to the specification of the liquid crystal display device which uses the color filter, in general, a soda lime glass which forms a thin film made of $SiO_2$ on the surface of the substrate SUB2 is used as the color filter substrate for a STN type (Super Twisted Nematic type, a typical example of a Passive Matrix type) liquid crystal display device, while an alkalifree glass (borosilicate glass) is used as the color filter substrate for a TFT type liquid crystal display device. In the former case, although the $SiO_2$ thin film which is formed on the surface of the substrate SUB2 is not shown in the drawing, the $SiO_2$ thin film is formed between the substrate SUB2 and the black matrix BM. Although the black matrix BM may be formed as an organic high-molecular film called the black resist as mentioned previously or may be formed as a metal film which exhibits the excellent light shielding characteristics such as chromium (Cr), the former is advantageous in the manufacturing steps from the viewpoint of the formation of the dyed media and the coating of the ink to the dyed media which will be explained later.

The black matrix BM which is formed of the organic high-molecular film in this embodiment is also called "a resin BM" and the absorbance is adjusted by usually setting a film thickness of a resin film (the above-mentioned black resist, for example) to be coated on a surface of the substrate in a range of 1 to 2 $\mu$m (micron, $10^{-6}$ m). The black resist is used such that carbon (graphite), organic pigment and the like are used as pigment singularly or in combination and the light shielding ratio is determined based on an addition quantity of the black resist to the resin component. In the TFT type liquid crystal display device, particularly with respect to the liquid crystal display device having an in-plane-switching (abbreviated as "IPS") type pixel structure, it is requested to set the resistance value of the black matrix BM to not less than $10^{-6}$ $\Omega/cm^2$, and preferably to $10^{-7}$ $\Omega/cm^2$. Accordingly, besides carbon, metal oxide or the like is dispersed in the inside of the resin as the pigment. As the raw material of the resin BM, a photosensitive black resist which is produced by adding (dispersing) the above-mentioned black pigment or the like into a negative-type photo-curing resin which generates the bridging reaction when ultraviolet rays are irradiated is used. Further, to explain the method of forming the black matrix BM, on the entire region of an upper surface of the substrate SUB2 (or the thin film made of $SiO_2$ formed on the substrate) which is subjected to cleaning, the above-mentioned black resist is coated using a spin coater, a roll coater or the like so that the film thickness becomes substantially uniform. Then, pre-baking is performed to remove the solvent in the inside of the resist. Thereafter, ultraviolet rays are irradiated through a given mask to harden or cure a pattern portion (portion where openings are not formed) of the black matrix. Finally, the resist remaining at unnecessary portions (portions where openings are formed) are removed by developing the black resist.

Further, as the black resist which is used as the raw material of the resin BM, "BK series" (product name) of Tokyo Ouka Kabushiki Kaisha or "DCF-K series" (product name) of Nihon Kayaku Kabushiki Kaisha (Nihon Kayaku Ltd. or Nihon Kayaku) was used. When the black matrix BM having a film thickness of 1.4 $\mu$m was formed using such a black resist, the optical density (OD value) of the black matrix BM became 3.7.

Subsequently, in a series of steps shown in FIG. 4B to FIG. 4C, using the black matrix BM, the dyed media are formed at regions (opening portions of the black matrix) which are partitioned by partition walls for every pixel (pixel region corresponding to respective color filters). First of all, the openings of the black matrix BM is coated with raw material DPX of the dyed media which constitute reception layers and the pre-baking is performed thereafter. Although natural protein (polymer through peptide linkage) such as gelatin, casein or the like may be used as the dyed media, in this embodiment, the dyed media which uses acrylic resin (polymer through ester linkage) is used, and "CFR-633 series products" (for example, "CFR-633L1" or "CFR-633DHP" (both being product names)) of Nihon Kayaku were used as the raw material of the dyed media. In this embodiment, the cross-linking density of the raw material of the dyed media in the state that the raw material is polymerized is lower than that of the raw material of the black matrix BM. The specific gravity of the raw material of the dyed media is also lower than that of the raw material of the black matrix BM. The rotational speed of the spinner when the above-mentioned raw material of the dyed media was used was set to 800 rpm. The film thickness of the dyed media after the pre-baking treatment at 80° C. for 10 minutes using a hot plate was set to 1.45 $\mu$m. The cross-sectional structure of the color filter substrate at this stage is shown in FIG. 4B (however, arrows of light hv being ignored).

Figure 4B:
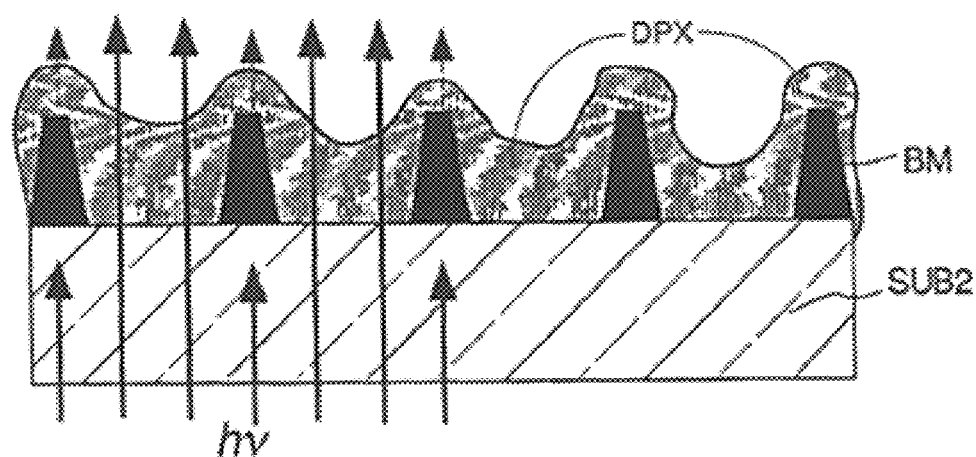
Figure 4C:
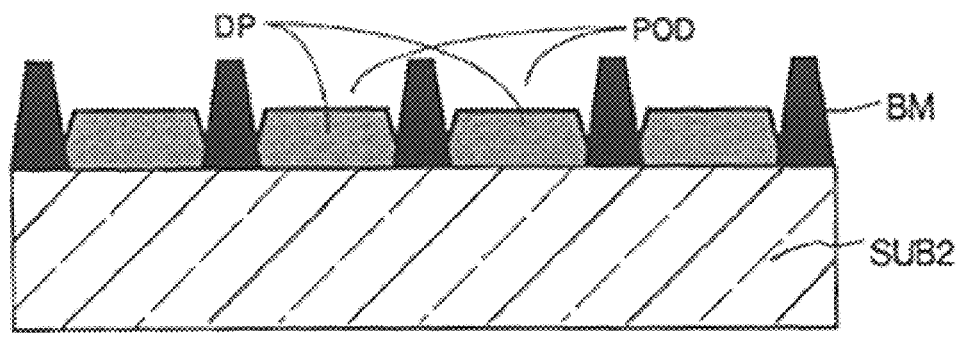

Subsequently, using a light source such as an extra-high pressure mercury lamp or the like, light hv having the wavelength: 365 nm and energy: 200 mj/cm² is irradiated from the first main surface and the second main surface opposite to the first main surface of the substrate SUB2 so as to partially expose the raw material DPX of the dyed media as shown in FIG. 4B. Usually, the exposure step is performed by irradiating light from the main surface side of the substrate on which the material to be processed is formed through a photo mask. However, in this embodiment, the light is irradiated from the main surface side on which the material to be processed (the raw material DPX of the dyed media) is not formed. This exposure mode is called the rear exposure. In this rear exposure, since the black matrix BM constitutes an exposure mask, with respect to the raw material of the dyed media which is coated on the first surface of the substrate SUB2, the light is not irradiated to portions of the raw material which are formed over the black matrix BM as indicated by broken-line arrows. Accordingly, with respect to the coated raw material of the dyed media, unnecessary portions can be removed without using a photo mask. On the other hand, the light having substantially uniform energy is irradiated to the raw material DPX of the dyed media which are coated on the opening portions of the black matrix BM. Accordingly, by setting the coating thickness thinner than the film thickness of the black matrix BM, only portions of the raw matrix DPX of the dyed media which are lower than the black matrix BM can be hardened with the irradiation of light. Further, with respect to the raw material of the dyed media which is coated on the opening portions, the energy of light which is irradiated to the peripheral portions along the black matrix BM is attenuated due to the shade of the black matrix BM per se or the like. Particularly, when the black matrix BM has a trapezoidal cross section (forward mesa type) as shown in FIG. 4B, with respect to the raw material DPX of the dyed media which is coated on the openings, portions to which the properly attenuated light is irradiated can be expanded and hence, the raw material DPX of the dyed media which is coated on the respective neighboring openings of the black matrix BM can be separated after curing (see DP of FIG. 4C). This brings about an advantageous effect that the ink INK (described later) which are supplied to respective openings are prevented from being mixed with each other between the neighboring openings whereby the ink INK can be retained in respective openings.

Due to the developing performed subsequently, the raw material of the dyed media which remains in the uncured state (without receiving the sufficient irradiation of light) is removed and the raw material DPX of the dyed media which has received the irradiation of light of a given energy is formed into the dyed media (dyed medium layers) DP by polymerization and remains in the openings of the black matrix BM. The removal of the uncured raw material of the dyed media from the surface of the substrate is performed by exposing the substrate in the plasma atmosphere, for example. Since the thickness (height) of the dyed media DP can be suppressed lower than that of the partition walls of the black matrix BM as shown in FIG. 4C, recesses POD which become the ink reservoirs are formed in the openings of the black matrix BM. Subsequently, the first main surface of the substrate SUB2 is dried by a so-called air-knife type dryer so as to remove the solvent or the like remaining in the dyed media DP. In this embodiment, the maximum film thickness (thickness at the centers of the openings of the black matrix) of the dyed medium layers DP after drying was 1.00 μm.

Subsequently, the previously mentioned ink INK according to the present invention is supplied to respective dyed medium layers DP corresponding to respective pixels using an inkjet type ink supply device as shown in FIG. 5A. A quantity of the ink (size of the droplet of the ink) is suitably set based on the size and the planar shape of the dyed medium layers DP which are formed corresponding to respective color filter pixels, that is, corresponding to respective openings of the black matrix BM. However, when the control of the ink dropping quantity can be performed with high accuracy, it is preferable to supply the ink INK such that the ink INK covers the whole upper surface of the dyed medium layer DP for every opening. With respect to the supply of the ink, the alignment of the nozzles of the ink supply device (see FIG. 6A, FIG. 6B) with the openings (dyed medium layers DP) of the black matrix BM are performed every one color. That is, the printing is repeated three times for every color of the ink (red ink INK (R), green ink INK (G) and blue ink INK (B)). Here, the printing can be performed in random order. The ink supply device is, as described in FIG. 6A, FIG. 6B and Japanese Laid-open Patent Publication 209669/1999, provided with ink ejecting nozzles which are arranged in one dimension or two dimensions (in an array, for example) and is constituted such that the ink supply device can simultaneously supply the ink to a plurality of dyed medium layers DP which are formed on the first main surface of the substrate SUB2 corresponding to the openings of the black matrix BM. Along with the enhancement of the high definition and the miniaturization of the liquid crystal display device, a tendency that the distance among a plurality of dyed medium layers DP is becoming small has been observed. However, there is substantially no case that the ink of the same color is supplied to neighboring dyed medium layers DP and hence, in this embodiment, without remodeling the ink supply device, the coloring of the dyed medium layers DP was performed by repeating the printing for every color of ink to be supplied. However, by reducing the size of the ink ejecting nozzles using the recent micro processing technique or by adjusting the pitch of the inkjet ejecting nozzles in the inkjet supply device, without repeating the coloring of the dyed medium layers DP for every color, the coloring may be performed by one printing as shown in FIG. 5A (by performing a so-called three-color simultaneous printing).

Figure 5B:
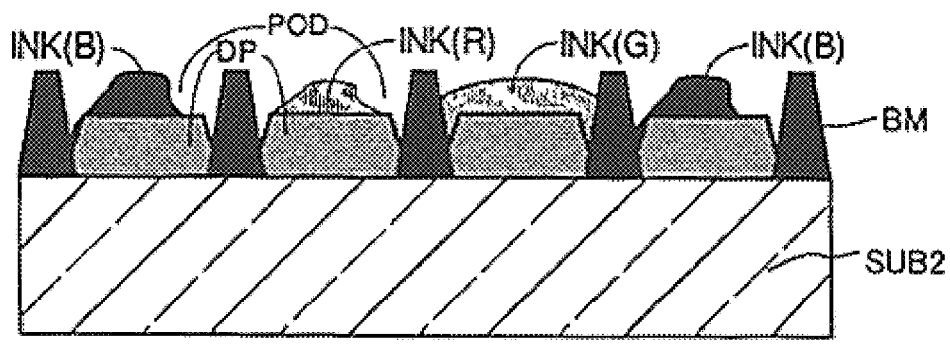
Figure 5C:
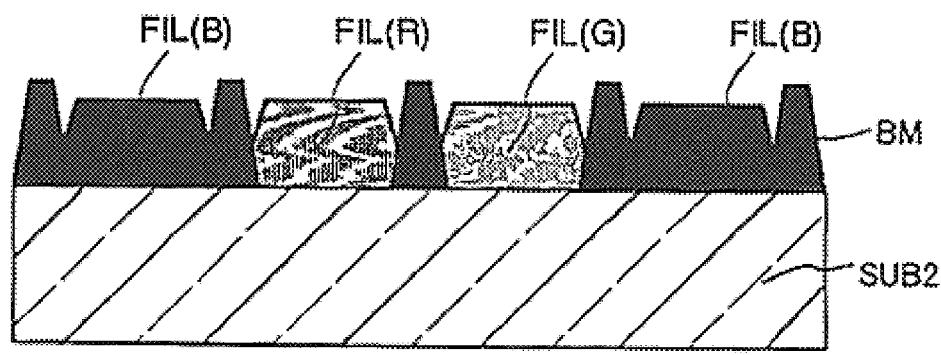

In each recess POD formed in each opening of the black matrix BM in the above-mentioned manner, a given quantity of any one of the red ink INK(R), the green ink INK(G) and the blue ink INK(B) is stored as shown in FIG. 5B. With the use of the previously-mentioned piezoelectric ink supply device, by setting the voltage applied to the piezoelectric transducer, a desired quantity of ink can be supplied to every opening of the black matrix BM. Ink in red, green or blue may differ in a quantity thereof to be supplied to the dyed medium layers DP formed in the openings of the black matrix BM corresponding to the coloring characteristics and the concentration of the dye contained in the ink. To make the liquid crystal display device display respective colors in good balance, it is necessary to average the coloring concentrations of the color filters FIL of respective colors. In the example shown in FIG. 5B, to compensate for the fact that the permeability of the green ink INK(G) to the dyed media is inferior to the permeability of other inks of other colors (red and blue) to the dyed media, a quantity of the green ink stored in the recess POD is increased compared to the inks of other colors. In this example, by setting the voltage applied to a piezoelectric crystal element mounted on the ink ejecting nozzle which ejects the green ink INK (G) higher than the voltages applied to piezoelectric crystal elements mounted respectively on other ink ejecting nozzles which supply inks of other colors, the displacement of the piezoelectric crystal element mounted on the nozzle for ejecting the green ink INK (G) between at the time of applying the voltage and at the time of stopping the applying of the voltage is set larger than the displacement of the other piezoelectric crystal elements mounted on the nozzles for ejecting the inks of other colors. In this manner, while a quantity of ink which is supplied to the recess POD of each opening formed in the black matrix BM can be controlled with the use of the piezoelectric type ink supply device, by ejecting the ink according to the present invention using this ink supply device, it becomes possible to supply respective inks which are different from each other in color to the recesses POD of the openings in respectively suitable quantities. In the example shown in FIG. 5B, although the ink supply quantities are made different corresponding to respective colors, the quantities of the inks of the same color which are supplied to the recesses POD of the openings of the black matrix BM are made substantially uniform among these recesses POD as can be clearly understood from the liquid surfaces of the blue ink INK(B) stored in the recesses POD of the openings of the black matrix BM which are indicated at left and right sides of the drawing. The detail of the series of the steps shown in FIG. 5A to FIG. 5C is explained later in conjunction with embodiments and compared examples of an experiment which was performed by changing the kinds of dyes and the composition ratios of the volatility-adjusting agent, the dyeing-promoter agent and the dye in ink.

After supplying the ink to the openings of the black matrix BM, the dye contained in the ink is diffused into the dyed medium layers DP to complete the red color filter layer FIL (R), the green color filter layer FIL (G) and the blue color filter layer FIL(B). In diffusing dyes of respective colors into the dyed medium layers DP which correspond to respective pixels, it is desirable to heat the substrate SUB2. Although a method which uses hot water or vapor, a method which heats in air or a method which exposes the substrate SUB2 in vapor of a solution is considered as a method for heating the substrate SUB2, the method which uses hot water is desirable. After the dyed medium layers DP which are formed for respective openings of the black matrix BM are respectively dyed in given colors to form the color filter layers FIL as show in FIG. 5C, the color filter layers FIL is coated with a film made of organic material such as silicon nitride ($SiN_x$), silicon oxide ($SiO_x$) polyimide or the like which constitutes the protection film PSV2 and the protection film PSV2 covers the upper portions of respective color filter layers FIL to prevent the diffusion of the dye. Thereafter, the protection film PSV2 is cured or hardened by the irradiation of ultraviolet rays, the heat treatment or the like.

Since the dye contained in the ink according to the present invention exhibits the hydrophilic property, in the manufacturing steps of the color filter substrates, the dye is dissolved in water which permeates into the dyed media from a periphery thereof. Particularly, when the color filter substrate is directly placed in the high-temperature and high-humidity situation, there arises a possibility that the peeling-off of the dye occurs. To the contrary, the above-mentioned protection film PSV2 functions as a passivation film which prevents the permeation of moisture into the color filter layers FIL(R), FIL(G) and FIL(B). Further, the protection film PSV2 also functions as a leveling layer which levels or averages an undulation of the substrate SUB2 at the first main surface side derived from the height difference between the black matrix BM and the color filters FIL formed in the openings of the black matrix BM. As mentioned above, the dyed media DP formed in the openings of the black matrix BM swell by dyeing the dyed media DP with ink in the state that raw material DPX is coated, and thereafter, the dyed medial DP shrink and is hardened by heating. A step which is formed between the black matrix BM and the color filter FIL due to the change of film thickness can be reduced with the use of the protection film PSV2. In the conventional color filter substrate, since the step between the color filter FIL formed in each opening and the black matrix BM is large, it is necessary to set the thickness of the protection film PSV2 to at least 1 to 2 $\mu$m. However, with the use of the ink according to the present invention, due to the composition of the ink, it becomes possible to efficiently make the dye per se permeate into the inside of the dyed media so that the swelling of the dyed media can be suppressed at a low level. Accordingly, it is sufficient to set the thickness of the protection film PSV2 in a range of less than 1 $\mu$m.

After forming the protection film PSV2, the counter electrode (common electrode) ITO2 is formed on the protection a film PSV2 by a sputtering method, for example. In the IPS type liquid crystal display device which mounts both of the pixel electrodes and the counter electrodes on the main surface of the substrate SUB1, this step becomes unnecessary. In the manufacturing of the color filter substrate used in the so-called active-matrix type liquid crystal display device which mounts a thin film transistor to each pixel region, the counter electrode ITO2 is formed such that the counter electrode ITO2 faces a plurality of pixel regions formed on the substrate SUB1 as shown in FIG. 8. However, in the manufacturing of the color filter substrate used in the passive matrix type liquid crystal display device as represented by the STN type (active element such as the thin film transistor being not provided to the pixel region), the common electrodes are formed as a plurality of stripes each of which intersects one of pixel electrodes (also called "segment electrodes" and extending in the direction to intersect the counter electrode) which are formed as a plurality of stripes on the substrate SUB1 in every pixel region.

Finally, the liquid crystal orientation control film (so-called "orientation film") ORI2 is coated such that the film covers the counter electrode ITO2 (black matrix BM and respective color filters FIL in case of the IPS type liquid crystal display device) and the rubbing treatment or the irradiation of ultraviolet rays is applied to the orientation film so as to form a so-called orientation pattern which orientates the liquid crystal molecules of the liquid crystal layer LC in a given direction. By performing this step, the color filter substrate is completed. Here, the liquid crystal orientation control film ORI2 is formed of organic high-molecular material having some rigidity such as polyimide.

The color filter substrate (the substrate SUB2 and a group of the above-mentioned thin films formed on the main surface of the substrate SUB2) which is produced in the above-mentioned manner and the other substrate SUB1 are arranged to face each other in an opposed manner as shown in FIG. 8 and are adhered to each other by means of a sealing agent (not shown in the drawing) which is coated on at least one periphery of each substrate. Thereafter, liquid crystal molecules (including additives such as a chiral agent or the like) is filled in a gap defined between the substrate SUB1 and the substrate SUB2 (space surrounded by the sealing agents) thus completing the liquid crystal display device (also called "liquid crystal display panel").

<<Review of color filter ink>>

With respect to the step for supplying the ink INK to the dyed media DP and the step for coloring the dyed media DP with the ink INK shown in FIG. 5, examples which performs such steps using the ink having the composition characterized by the present invention and examples which performs such steps using ink other than such ink INK are grouped such that the former examples constitute embodiments 1 to 6, while the latter examples constitute compared examples 1 to 2, and the spectral characteristics of the color filters obtained by respective embodiments and compared examples are compared with each other. Here, in respective embodiments and compared examples, the preparation of the ink was performed by adding the above-mentioned dye into a mixture solvent which was prepared by mixing the above-mentioned volatility-adjusting agent, the dyeing-promoter agent and the solvent. Further, in all embodiments and compared examples, the ink INK was supplied to the dyed media DP using the piezoelectric type ink supply device (called "inkjet" hereinafter).

Embodiment 1

Ink containing 1 percent by weight of PC Red 136P (product name) produced by Nihon Kayaku as the dye, 40 percent by weight of glycerin as the volatility-adjusting agent, 10 percent by weight of N-methyl-2-pyrrolidone as the dyeing-promoter agent, and 50 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL (defined as "colored dyed media DP" hereinafter. Also defined in the same manner in embodiments and compared examples described hereinafter). Thereafter, the coloring state and the optical spectrum of the color filter FIL were measured.

Embodiment 2

Ink containing 3 percent by weight of PC Red 136P (product name) produced by Nihon Kayaku as the dye, 40 percent by weight of glycerin as the volatility-adjusting agent, 10 percent by weight of N-methyl-2-pyrrolidone as the dyeing-promoter agent, and 50 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Embodiment 3

Ink containing 3 percent by weight of PC Red 136P (product name) produced by Nihon Kayaku as the dye, 20 percent by weight of glycerin as the volatility-adjusting agent, 10 percent by weight of N-methyl-2-pyrrolidone as the dyeing-promoter agent, and 70 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Embodiment 4

Ink containing 3 percent by weight of PC Red 136P (product name) produced by Nihon Kayaku as the dye, 20 percent by weight of glycerin as the volatility-adjusting agent, 20 percent by weight of N-methyl-2-pyrrolidone as the dyeing-promoter agent, and 60 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Embodiment 5

Ink which respectively containing 5 percent by weight of PC Red 136P (product name) produced by Nihon Kayaku as the dye, 20 percent by weight of glycerin as the volatility-adjusting agent, 20 percent by weight of N-methyl-2-pyrrolidone as the dyeing-promoter agent, and 60 percent by weight of water as the solvent was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Embodiment 6

Ink containing 5 percent by weight of PC Red 136P (product name) produced by Nihon Kayaku as the dye, 20 percent by weight of glycerin as the volatility-adjusting agent, 30 percent by weight of N-methyl-2-pyrrolidone as the dyeing-promoter agent, and 50 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Compared Example 1

Ink containing 1 percent by weight of PC Red 136P (product name) produced by Nihon Kayaku as the dye, 10 percent by weight of N-methyl-2-pyrrolidone as the dyeing-promoter agent, and 90 percent by weight of water as the solvent respectively was prepared. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

Compared Example 2

Ink was prepared by mixing 1 percent by weight of PC Red 136P (product name) produced by Nihon Kayaku as the dye into the solvent made of only water. Subsequently, one droplet (approximately 10 pL) of the ink INK was ejected from the inkjet onto the dyed media DP having the film thickness of 0.8 µm which was formed using CFR-633 (product name) produced by Nihon Kayaku thus producing the color filter FIL. Thereafter, the coloring state and the optical spectrum of the color filter FIL were measured.

The observation result of the coloring state of the color filter FIL and the measurement result of the optical spectrum obtained by the above-mentioned embodiments and compared examples are shown in Table 1. The measurement result of the optical spectrum is expressed as the value of CIE-chromaticity x, y, Y which are obtained by converting the measured optical spectrum into a C light source. This CIE-chromaticity are values based on the CIE-UCS diagram (Commission International de l'Eclairage-Uniform Chromaticity Scale diagram).

TABLE 1

| | State of Printed Area | C.I.E-Chromaticity | | |
|---|---|---|---|---|
| | (Observed Dyed Medium) | x | y | Y |
| Embodiment 1 | Good | 0.352 | 0.311 | 72.4 |
| Embodiment 2 | Good | 0.405 | 0.311 | 52.9 |
| Embodiment 3 | Good | 0.478 | 0.317 | 37.4 |
| Embodiment 4 | Good | 0.510 | 0.320 | 32.5 |
| Embodiment 5 | Good | 0.582 | 0.329 | 23.7 |
| Embodiment 6 | Good | 0.504 | 0.320 | 33.6 |
| Compared Example 1 | Precipitation of Dye Orange Peel-like Surface | 0.378 | 0.311 | 61.9 |
| Compared Example 2 | Precipitation of Dye | 0.341 | 0.309 | 79.5 |

From the above Table 1, it is understood that the dyeing performance can be enhanced by making the ink contain N-methyl-2-pyrrolidone. Further, it is also understood that the precipitation of dye can be prevented by making the ink contain glycerin. Accordingly, by setting the composition of the ink in the range of the present invention, the tone of the color filter FIL can be adjusted to a desired state. Further, the color filter substrate with high quality can be manufactured by covering the whole upper surfaces of respective dyed media DP with the ink INK while suppressing a quantity of the ink INK supplied to each dyed medium (dyed medium corresponding to one pixel region, for example, which is formed in every opening of the black matrix BM).

The case in which the red ink (including the dye made of azo complex which is coordinated to chromium (Cr) or the like) is used has been described with respect to the above-mentioned embodiments and compared examples, similar results are obtained in a case that the green ink (including dye made of phthalocyanine coordinated to copper (Cu) or the like) is used or in a case that the blue ink (including dye made of anthraquinone) is used. Further, although the dyed media DP which is formed of acrylic resin was used in the above-mentioned embodiments and compared examples, the similar results are obtained by forming the dyed media DP of the natural polymer which is polymerized with peptide linkage such as casein or gelatin.

As has been explained heretofore, according to the manufacturing method of the liquid crystal display device of the present invention, the color filter substrate which is prepared for the manufacturing of such a liquid crystal display device can, due to the ink used in the coloring step, substantially totally reduce the color irregularities on the displayed image even when the color filter substrate is assembled into the liquid crystal display device. Further, since this ink can be supplied to the dyed media on the color filter substrate using the inkjet method, the color filter substrate with quality which can sufficiently cope with the miniaturization of the display screen can be prepared.

The above-mentioned ink can, by adjusting the balance between the action of the volatility-adjusting agent and the action of the dyeing-promoter agent contained in the ink, suppress the irregularities of the volume (quantity) of the droplets of ink supplied respectively to a plurality of dyed media formed on the substrate having the high optical transmissivity such as glass or the plastic. Further, it becomes possible to make the dye contained in the ink permeate into the inside of the dyed media with the favorable reproducibility. Accordingly, in the manufacturing of the color filter layer (so-called "color filter substrate") of the liquid crystal display device which colors these dyed media, the irregularities of the coloring concentration for every dyed medium can be suppressed so that the liquid crystal display device which can display a color image over the whole screen without damaging the balance of color can be realized.

Further, in the step to supply the ink according to the present invention to the dyed media by using the inkjet type ink supply device, and more particularly, by ejecting the ink droplet making use of the mechanical displacement of the piezoelectric crystal element, the scattering of the ink (the scattering of the ink to the dyed medium other than the dyed medium to which the ink is to be supplied) can be suppressed. Accordingly, the ink according to the present invention can be also used for the manufacturing of the color filter substrate having the narrow distance between the dyed media which is used in the liquid crystal display device for the portable telephone or the liquid crystal display device for the high definition image display and can remarkably enhance the productivity (yield or the like) of the color filter substrates.

<<Color concentration of color filter>>

As mentioned above, the present invention provides the ink having composition thereof preferable for permeating through a medium (a base layer to be dyed). The inventors of the present invention further consider the color filter structure preferable for applying the aforementioned manufacturing method thereto with respect to such the characteristic of the ink according to the present invention.

Figure 10:
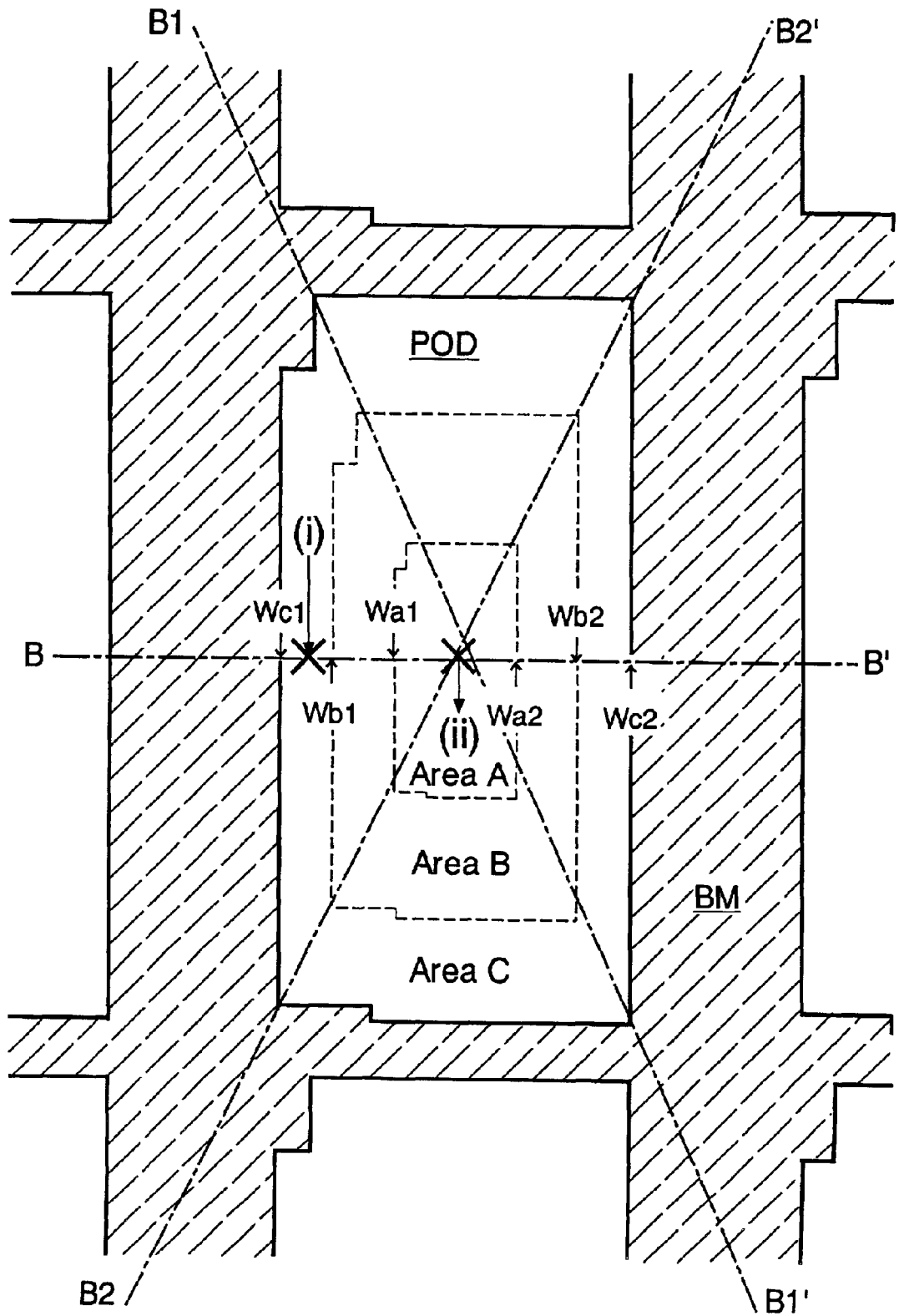
FIG. 10 is a plan view of an enlarged opening of the black matrix formed on the color filter substrate.

FIG. 10 shows a plan view of the color filter structure with respect to the pixel structure shown in FIG. 7, and the color filter structure will be mentioned with reference to one of the recesses POD surrounded by the black matrix BM (forming an opening of the black matrix BM) in a center of FIG. 10 hereinafter. FIGS. 11A and 11B show cross-sectional views of the color filter structures taken along a dot-dash line B–B' in FIG. 10, and FIG. 11A is depicted for the substrate SUB2 having the black matrix BM of the hydrophilic material formed thereon as well as FIG. 11B is depicted for the substrate SUB2 having the black matrix BM of the a hydrophobic material formed thereon. Since each medium DP (being not stained yet) is provided in each recess POD by the aforementioned photolithography process using back exposure, each of the thickness profiles of the media DP depicted in FIGS. 11A and 11B indicates a curve along every line (e.g. dot-dash lines B1–B1', B2–B2') crossing over the recess POD as well as the dot-dash line B–B' shown in FIG. 10. If the black matrix BM is provided as a film formed of an organic material (e.g. synthetic resins), the black matrix BM will be so thicker than any media DP remained in the recesses POD after the photolithography process shown as FIGS. 11A and 11B that the media DP is isolated from each other by the black matrices BM per the respective recesses POD. Dividing each medium DP into every recess POD is preferable to apply the ink according to the present invention for staining the medium thereby.

As the ink according to the present invention indicates good wet property with the medium DP and permeates therethrough smoothly, the ink may also stain the medium DP excessively. The optical transmissivity of the color filter FIL (the dyed medium DP stained with the ink) depends on the amount of dye accumulated in the dyed medium DP along thickness direction thereof. Therefore, color concentration of the dyed medium DP may indicate its distribution along the aforementioned line crossing over the recess POD like the dot-dash lines B–B', B1–B1', and B2–B2'. The inventors of the present invention manufactured a color filter substrate experimentally having a planar structure shown in FIG. 10 by supplying the ink through the aforementioned ink-jet apparatus, and observed color concentration of the dyed medium DP formed in the recess POD at a point (i) in a periphery of the dyed medium and a point (ii) in a center of the dyed medium marked by crosses X. One of the results is summarized in conformity with the value of CIE-chromaticity x, y, Y in the table 2.

TABLE 2

| | Point | x | y | Y |
|---|---|---|---|---|
| Red | (i) | 0.590 | 0.346 | 23.222 |
| | (ii) | 0.625 | 0.344 | 18.648 |
| Green | (i) | 0.315 | 0.531 | 60.112 |
| | (ii) | 0.299 | 0.571 | 51.448 |
| Blue | (i) | 0.145 | 0.165 | 21.172 |
| | (ii) | 0.133 | 0.136 | 14.190 |

In accordance with the result shown in table 2, the dyed medium stained with red indicates an error (a difference) not smaller than 0.02 between x values of the CIE-chromaticity observed at the points (1) and (ii). On the other hand, the dyed medium stained with green indicates an error not smaller than 0.02 between y values of the CIE-chromaticity observed at points (i) and (ii). Each of the errors of the x and y values not smaller than 0.02 make bright-unevenness in the dyed medium DP recognized in the display area of the liquid crystal display device.

Moreover, an error not smaller than 10% between Y values of the CIE-chromaticity at the points (i) and (ii) is observed in each of the dyed media in this result. If the error appearing between the Y values observed at a periphery and a center of the dyed medium is not smaller than 10% of one of the Y values, bright-unevenness in the dyed medium can be recognized in the display area especially in the case that the display area displays a middle-toned image. Such the error appearing in the Y-value is regarded to make the display image sandy.

The inventors of the present invention considered this problem by dividing the dyed medium DP into three areas A, B, and C in a manner shown in FIG. 10 with reference to the cross sectional views of FIGS. 11A and 11B. Due to the aforementioned characteristics of the ink according to the present invention, the ink permeates through the dyed medium DP almost uniformly along thickness direction of the dyed medium. Therefore, permeation front of the ink in the dyed medium DP is assumed to be shaped in accordance with an upper surface of the dyed medium (on which the ink is supplied), and the dye amount injected into the dyed medium can be estimated roughly by the distance between the upper surface and the permeation front. Based on these assumption, if the ink according to the present invention continues to permeate through the dyed medium after a part of permeation front of ink reaches a bottom of the dyed medium DP (defined by a boundary plane between the dyed medium DP and the substrate SUB2 exemplified in FIGS. 11A and 11B), the dye is accumulated more at an a part of the dyed medium corresponding to the part of the front than the other part thereof. Hitherto, it is recommended that the whole of the permeation front of the ink reaches the bottom surface of the dyed medium so that the dye is distributed throughout the dyed medium. Thus, permeation of the ink through the dyed medium is continued until the dyed medium becomes saturated therewith.

However, while the present invention improves the permeation characteristics of the ink through the dyed member so that the dye is uniformly distributed therein, such a conventional idea for staining the dyed medium with the ink may be revised. Namely, the conventional idea may cause the color-concentration unevenness along the upper surface of the dyed medium stained with the ink having the novel composition, exemplified as low concentration at point (i) and high concentration at point (ii) in the case of FIG. 11A, and high concentration at point (i) and low concentration at point (ii) in the case of FIG. 11B.

Such the color-concentration unevenness of the dyed medium can be solved by the ink according to the present invention, because the present invention also enables to adjusting composition ratio among the dye, the solvent, the volatility-adjusting agent, and the dyeing-promoter agent included in the ink in respective wide ranges thereof. One of the methods to solve this problem is to set the dye concentration higher in the ink. Another of the methods is to increase the dyeing-promoter agent in the ink so as to level the permeation front thereof in the dyed medium without respect to curvature of the upper surface of the dyed medium. According to the aforementioned experimental result by the inventors, the Y value of the CIE-chromaticity observed at the area C and the area A should remain at the value smaller than 10% of one of the Y values larger than another thereof. Moreover in this viewpoint, at least one of the x value and the y value of the CIE-chromaticity observed at the area C and the area A should be smaller than 0.02. The areas A, B, and C are defined along any lines crossing the dyed medium DP (an opening of the black matrix BM, in other word) between a pair of edges thereof opposite to one another (like the dot-dash line B–B'), or between corners thereof opposite to one another (like the dot-dash lines B1–B1', B2–B2').

With reference to FIGS. 11A and 11B, the area C is extended from the edge of the dyed medium DP (or, an edge of an opening of the black matrix BM along the bottom of the dyed medium) by the distance (indicated as Wc1–Wb1, and Wc2–Wb2) equivalent to 20% of the length between Wc1 and Wc2. As the length between Wc1 and Wc2 is also defined as that of the line crossing over the dyed medium DP or the opening of the black matrix BM, the length Wc1–Wc2 is called a crossover length. hereinafter. The area A is enclosed an outline similar to that of the dyed medium DP or the opening of the black matrix BM. and spaced from edges (or, an outline) of the dyed medium DP or the opening of the black matrix BM by the distance (indicated as Wc1–Wa1, and Wc2–Wa2) equivalent to 40% of the crossover length.

From another viewpoint, the inventors recommend to prevent the dyed medium from being saturated with the ink. One of the color filter structures based on this viewpoint is shown in FIG. 12A. The features in this color filter structure are the permeation front of the dye PENF (injected by the ink) spaced from the bottom of the medium DP and non-stained area NST remaining along the bottom surface of the medium. As the ink tends to gather at lower portion in the upper surface DSUF of the medium exemplified by the point (ii), it is necessary to suppress the permeation of the ink in this portion. As the logical consequence for the medium DP provided in a opening of the black matrix BM by the photolithography process using the back exposure, the medium DP has lower portion and higher portion in the upper surface DSUF with respect to the bottom thereof.

In FIGS. 11A and 11B, height of the lower portion defined in the area A or C in the upper surface of the medium DP is shown as t1. On the other hand, height difference between the lower portion of the medium DP and the higher portion thereof defined in the area C or A is shown as t2, and has a value close to one-eighth of t1, or more. For preventing the dye from being concentrated at the lower portion of the medium DP, one of the methods to increase the dye concentration in the ink. To reduce amount of the ink supplied to every medium is also recommended. To cease the permeation of the ink before the permeation front PENF reaches the bottom of the medium DP, the volatility-adjusting agent in the ink should be reduced properly. In one of the medium being stained with the ink having composition determined in accordance with the recommendation, concentration profile of the dye appears in the medium along thickness direction thereof. FIG. 12A exemplifies the concentration profile of the dye formed of a region CONC1 (high concentration), a region CONC2 (middle concentration), and a region CONC3 (low concentration). Each of interfaces between these regions is curved in accordance with a curvature of the upper surface DSUF of the medium DP.

The interfaces between the regions CONC1, CONC2, and CONC3 are depicted with thin solid lines, but the dye concentration in each of these regions is so gradated along the thickness direction of the medium DP actually that these interfaces are seemed to be blurred usually. Anyway, the dye concentration in one of the novel color filter structures distributes along the curvature of the upper surface DSUF of the medium DP, and decreases itself gradually from the upper surface DSUF along the thickness direction of the medium DP. This structural feature reduces transmissivity unevenness of the color filter layer in an upper surface thereof, sufficiently.

While the permeation front PENF of the dye is shown not to reach the bottom of the medium DP FIG. 12A, however a part of the permeation front PENF may reach the bottom of the medium so as to leave the non-stained area NST at least in a part in the medium DP with respect to the aforementioned higher portion in the upper surface thereof. On the other hand, the permeation front PENF may be blurred in contrast to that shown in FIG. 12A. As another of the novel color filter structures shown in FIG. 12B, the permeation front may be vanished (not be distinguished) in the dye concentration profile thereof. However, the dye concentration profile in the medium DP in FIG. 12B also shows the aforementioned feature with reference to that in FIG. 12A. The dye concentration profile (as exemplified by regions CONC1, CONC2, and CONC3) will be observed not only by optical technique but by element analysis using mass spectrometry, characteristic X-ray spectrum thereof, etc. When the dye is complex (coordination compound) having the specific element(s) in a center thereof, it is recommended to evaluate the novel color filter structure with the distribution of the specific element in the medium DP. According to one of criteria for fabricating the novel color filter structures, the dye concentration at the bottom of the medium DP should be not greater than 10% of that along the upper surface DSUF thereof.

The novel color filter structures in accordance with the present invention are explained based on the color filter structure having a black matrix BM of a hydrophilic material as shown in FIGS. 11A, as above. However, the novel structures can be applied to the color filter structure a black matrix BM of a hydrophobic material as shown in 11B. A cross sectional view of one of the color filter structures based on that of FIG. 11B is depicted on the analogy of FIG. 12A as FIG. 12C shows.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. A manufacturing method of liquid crystal display device, including:

a step for preparing a first substrate having a first main surface on which color filters are farmed, a step for bonding the first substrate and a second substrate having a second main surface with a sealing material at respective peripheries of the first and second substrate being superposed one another so that the first main surface and the second main surface are spaced from and opposite to one another, and a step for injecting liquid crystal substances into a space enclosed by the first and second main surfaces and the sealing material, wherein the color filters are formed by coloring dyed media provided on the first main surface with ink, the ink includes dye for coloring the dyed media, solvent having affinity for the dye, a volatility-adjusting agent lowering volatility of the ink below that of the solvent, and a dyeing-promoter agent indicating higher affinity for the dye and the dyed media than to the volatility-adjusting agent, and concentration of the dye in the ink lies-in a range from 1 to 5 weight percent thereof; concentration of the volatility-adjusting agent therein lies in a range from 1 to 40 weight percent thereof, and concentration of the dyeing-promoter agent therein lies in a range from 1 to 30 weight percent thereof, respectively.

2. A manufacturing method of liquid crystal display device according to claim 1, wherein the volatility-adjusting agent indicates a higher boiling point than that of the solvent, and the dyeing-promoter agent indicates viscosity lower than that of the volatility-adjusting agent and higher than that of the solvent.

3. A manufacturing method of liquid crystal display device according to claim 1, wherein a molecule of the dyeing-promoter agent has at least one of bonding structures consisting of ester linkage, peptide linkage, and peptide linkage having a nitrogen atom thereof modified by alkyl group.

4. A manufacturing method of liquid crystal display device according to claim 3, wherein the dyeing-promoter agent has a molecular structure including ring-like portion which consists of a plurality of carbon atoms and at least one molecule other than carbon being bonded to each other with single bond, and the at least one of bonding structures consisting of ester linkage, peptide linkage, and peptide linkage having a nitrogen atom thereof modified by alkyl group is formed in the ring-like portion.

5. A method for manufacturing the liquid crystal display device according to claim 3, wherein the dyed media are formed of organic materials by polymerization thereof via at least one of bonding structures consisting of ester linkage, peptide linkage, and peptide linkage having a nitrogen atom thereof modified by alkyl group.

6. A manufacturing method of liquid crystal display device, including:

a step for preparing a first substrate having a first main surface on which color filters are formed, a step for bonding the first substrate and a second substrate having a second main surface with a sealing material at respective peripheries of the first and second substrate being superposed one another so that the first main surface and the second main surface are spaced from and opposite to one another, and a step for injecting liquid crystal substances into a space enclosed by the first and second main surfaces and the sealing material, wherein the color filters are formed by coloring dyed media provided on the first main surface with ink, the ink includes dye for coloring the dyed media, water or hydrophilic solvent, at least one selected from a group consisting of glycerin, dimethyl sulfoxide, and sodium lactate, and at least other one selected from another group consisting of N-methyl-2-pyrrolidone and γ butyrolactone, and concentration of the dye in the ink lies in a range from 1 to 5 weight percent thereof, concentration of the at least one selected from the group consisting of glycerin, dimethyl sulfoxide, and sodium lactate therein lies in a range from 1 to 40 weight percent thereof, and concentration of the at least other one selected from the another group consisting of N-methyl-2-pyrrolidone and γ butyrolactone therein lies in a range from 1 to 30 weight percent thereof, respectively.

7. A method for manufacturing the liquid crystal display device according to claim 6, wherein the dye is any compound selected from a group consisting of azo complex, phthalocyanine, and anthraquinone.

8. A method for manufacturing the liquid crystal display device according to claim 6, wherein the dye media are formed of any resin selected from a group consisting of acrylic resin, casein resin, and gelatin resin.

9. A manufacturing method of liquid crystal display device, including:

a step for preparing a first substrate having a first main surface on which color filters are formed, a step for bonding the first substrate and a second substrate having a second main surface so that the first main surface and the second main surface are spaced from and opposite to one another, and a step for injecting liquid crystal substances into a space enclosed by the first and second main surfaces and the sealing material, the first substrate is formed by manufacturing process including:

a first step for forming a light shielding film having lower optical transmissivity than that of the first substrate over the first main surface, and then making a plurality of openings in the light shielding film to be spaced from each other;

a second step for forming dyed media out of resin which has higher optical transmissivity than that of the light shielding film in the respective openings formed through the light shielding film;

a third step for coloring the dyed media formed in the respective openings by supplying droplets of the ink thereto; and a fourth step for forming a protective film on the light shielding film so as to cover the respective dyed media in the plurality of openings with the protective film, wherein liquid including dye for coloring the dyed media, solvent for the dye, a first reagent having lower volatility than that of the solvent, and a second reagent having higher permeability into the resin constituting the dyed media than that of the solvent is utilized for the ink, and the droplets of the ink are supplied to each of the plurality of openings from a nozzle comprising a ink chamber in the third step, and volume of the ink chamber is varied by piezoelectric element.

10. A method for manufacturing the liquid crystal display device according to claim 9, wherein volume of the droplets supplied from the nozzle to each of the plurality of openings amounts in a range from 1 pico-liter to 100 pico-liter.

11. A method for manufacturing the liquid crystal display device according to claim 9, wherein volume of the droplets supplied to each of the plurality of openings amounts in a range from 2 pico-liter to 6 pico-liter.

12. A method for manufacturing the liquid crystal display device according to claim 11, wherein composition ratio of the dye in the ink is set in a range from 1 to 5 weight percent thereof, composition ratio of the solvent in the ink is set in a range from 10 to 80 weight percent thereof, composition ratio of the first reagent in the ink is set in a range from 5 to 20 weight percent thereof, and composition ratio of the second reagent in the ink is set in a range front 1 to 30 weight percent thereof.

13. A method for manufacturing the liquid crystal display device according to claim 9, wherein volume of the droplets supplied from the nozzle to each of the plurality of openings amounts in a range from 20 pico-liter to 40 pico-liter.

14. A method for manufacturing the liquid crystal display device according to claim 13, wherein composition ratio of the dye in the ink is set in a range from 1 to 5 weight percent thereof, composition ratio of the solvent in the ink is set in a range from 10 to 80 weight percent thereof, composition ratio of the first reagent in the ink is set in a range from 30 to 40 weight percent thereof, and composition ratio of the second reagent in the ink is set in a range from 1 to 30 weight percent thereof.

15. A method for manufacturing the liquid crystal display device according to claim 9, wherein the resin constituting the dyed media is provided by forming a layer of a material having a characteristic to be hardened by photo-irradiation thereto on the light shielding film which is formed on the first main surface of the first substrate and has a plurality of openings, and then by hardening a part of the material layer by photo-irradiation onto another main surface of the first substrate at an opposite side thereof to the first main surface.

16. A method for manufacturing the liquid crystal display device according to claim 9, wherein the dye media and the second reagent are organic materials having at least one of ester linkage and peptide linkage in molecules thereof, respectively.

17. A method for manufacturing the liquid crystal display device according to claim 9, wherein the manufacturing process includes a fifth step for forming a transparent conductive film on the protective film after the fourth step.

18. A method for manufacturing the liquid crystal display device according to claim 17, wherein a soda lime glass having a silicon oxide film on a main surface thereof is utilized for the first substrate.

* * * * *